(12) United States Patent
Wanger et al.

(10) Patent No.: US 8,720,615 B2
(45) Date of Patent: May 13, 2014

(54) METHODS AND APPARATUS FOR UTILIZING ELECTRICALLY POWERED VEHICLES

(75) Inventors: Mark E. Wanger, Fort Collins, CO (US); Mark A. Anderson, Fort Collins, CO (US)

(73) Assignee: EV-IP, LLC, Fort Collins, CO (US)

( * ) Notice: Subject to any disclaimer, the term of this patent is extended or adjusted under 35 U.S.C. 154(b) by 0 days.

(21) Appl. No.: 13/615,232

(22) Filed: Sep. 13, 2012

(65) Prior Publication Data

US 2013/0000439 A1 Jan. 3, 2013

Related U.S. Application Data

(63) Continuation of application No. 12/965,607, filed on Dec. 10, 2010, now Pat. No. 8,297,384.

(51) Int. Cl.
*B62D 59/04* (2006.01)
*B60K 26/04* (2006.01)

(52) U.S. Cl.
CPC ............... *B62D 59/04* (2013.01); *B60K 26/04* (2013.01)
USPC .......................................... 180/14.2; 180/335

(58) Field of Classification Search
USPC ............... 180/14.2, 315, 335, 333, 334, 336; 74/473.13, 488, 491, 551.9
See application file for complete search history.

(56) References Cited

U.S. PATENT DOCUMENTS

| | | | | |
|---|---|---|---|---|
| 1,165,467 A * | 12/1915 | Tideman | ........................ | 180/11 |
| 4,256,197 A * | 3/1981 | Kiser, Jr. | ...................... | 180/335 |
| 4,630,703 A * | 12/1986 | Fletcher | ........................ | 180/219 |
| 4,641,723 A * | 2/1987 | Takanashi et al. | ............ | 180/315 |
| 5,141,067 A * | 8/1992 | Diggs | .............................. | 180/11 |
| 5,201,442 A * | 4/1993 | Bakalian | ....................... | 222/610 |
| 5,247,431 A * | 9/1993 | Liu | ................................ | 362/474 |
| 5,370,412 A * | 12/1994 | Chou | ......................... | 280/288.4 |
| 5,816,349 A * | 10/1998 | Hankins | ......................... | 180/11 |
| 5,893,295 A * | 4/1999 | Bronnert | ........................ | 74/488 |
| 5,933,076 A * | 8/1999 | Babb | .............................. | 340/475 |
| 6,276,230 B1 * | 8/2001 | Crum et al. | .................. | 74/551.9 |
| 6,308,590 B1 * | 10/2001 | Berto | .......................... | 74/551.8 |
| 6,725,955 B2 * | 4/2004 | Bidwell | .......................... | 180/11 |
| 7,243,937 B2 * | 7/2007 | Ishikawa | ................... | 280/288.4 |
| 7,311,322 B2 * | 12/2007 | Kitamura et al. | ............. | 280/260 |
| 7,466,036 B2 * | 12/2008 | Ledford et al. | ............... | 307/9.1 |
| 7,565,848 B2 * | 7/2009 | Fujii | .......................... | 74/473.12 |
| 2003/0032327 A1 * | 2/2003 | LaBonte | ....................... | 439/527 |
| 2003/0047372 A1 * | 3/2003 | Fechner | ........................ | 180/335 |
| 2004/0163485 A1 * | 8/2004 | Ginnetti | .......................... | 74/488 |
| 2005/0057921 A1 * | 3/2005 | Menosky | ...................... | 362/110 |

(Continued)

*Primary Examiner* — Anne Marie Boehler
*Assistant Examiner* — Maurice Williams
(74) *Attorney, Agent, or Firm* — Martensen IP

(57) ABSTRACT

A quick release electric throttle assembly connected to a supplemental electric propulsion system, wherein the propulsion system may be moved from one vehicle to another, and the throttle must be correspondingly moved among the vehicles as well is disclosed. The quick release interface may incorporate a disengaging and disengageable electric connection to permit electrical wiring to be quickly plugged and unplugged from the hand actuated accessory. The throttle may be further be configured as a low profile throttle, such as having a flat surface with at least one button by which the throttle may be actuated. The throttle may be secured and released from the control surface of a vehicle by wrapping the laminar flexible sheet at a desired position and wrapping a Velcro like strap over one another about the manual control surface.

17 Claims, 17 Drawing Sheets

(56) References Cited

U.S. PATENT DOCUMENTS

| | | | |
|---|---|---|---|
| 2005/0098978 A1* | 5/2005 | Kitamura et al. | 280/260 |
| 2007/0221644 A1* | 9/2007 | Gifford et al. | 219/204 |
| 2008/0023234 A1* | 1/2008 | Wang | 180/14.2 |
| 2008/0037818 A1* | 2/2008 | Ierfone et al. | 381/389 |
| 2008/0099266 A1* | 5/2008 | Hiroi et al. | 180/219 |
| 2009/0069081 A1* | 3/2009 | Thorner | 463/30 |
| 2009/0235772 A1* | 9/2009 | Naka et al. | 74/502.2 |
| 2009/0293668 A1* | 12/2009 | Kondo et al. | 74/551.9 |
| 2010/0029172 A1* | 2/2010 | Howell | 446/404 |
| 2010/0097325 A1* | 4/2010 | Nagao et al. | 345/173 |
| 2010/0200033 A1* | 8/2010 | Forester | 135/88.04 |
| 2012/0137817 A1* | 6/2012 | Wang | 74/491 |
| 2012/0150377 A1* | 6/2012 | Buchheim et al. | 701/22 |
| 2012/0200061 A1* | 8/2012 | D'Aluisio | 280/281.1 |

* cited by examiner

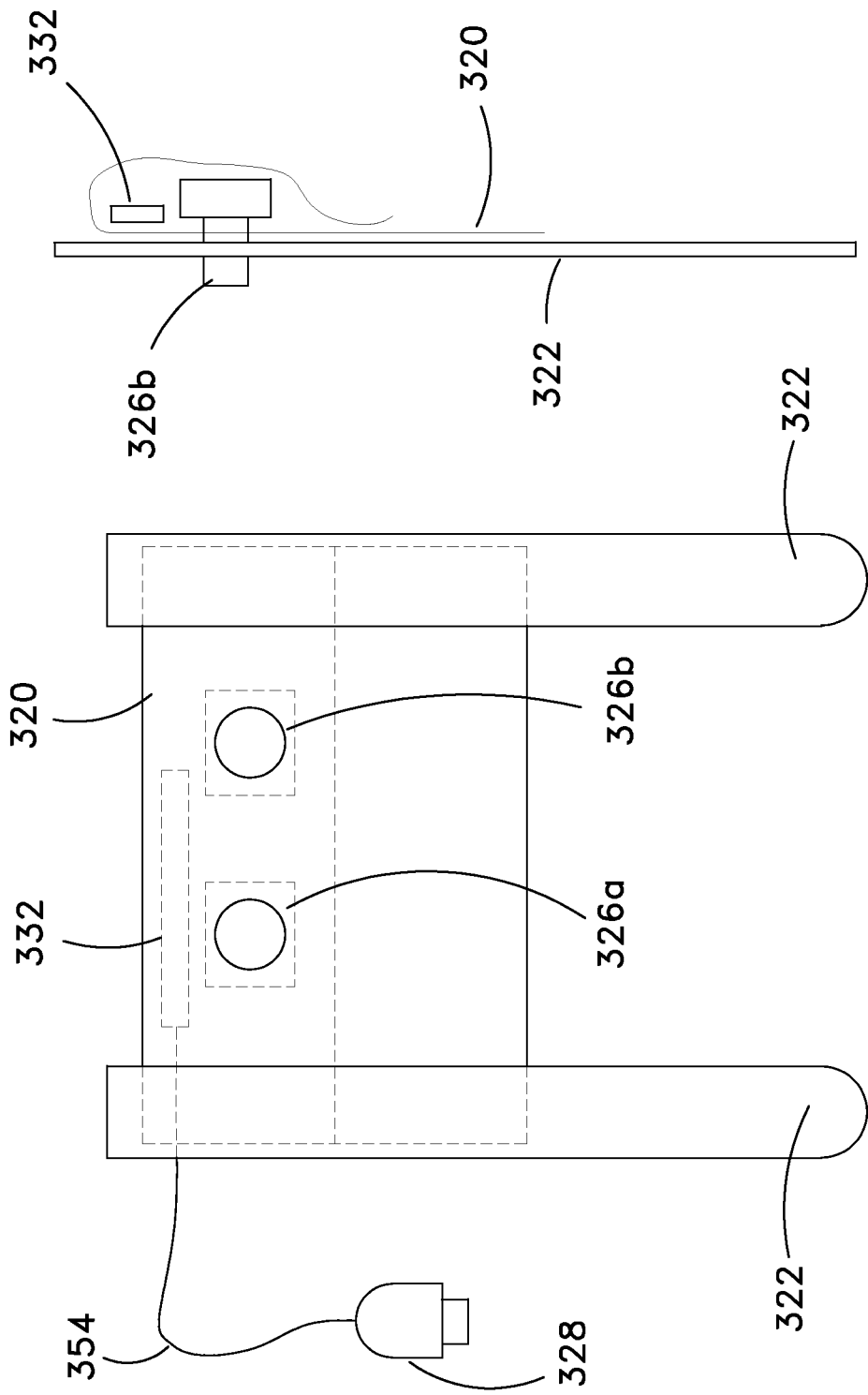

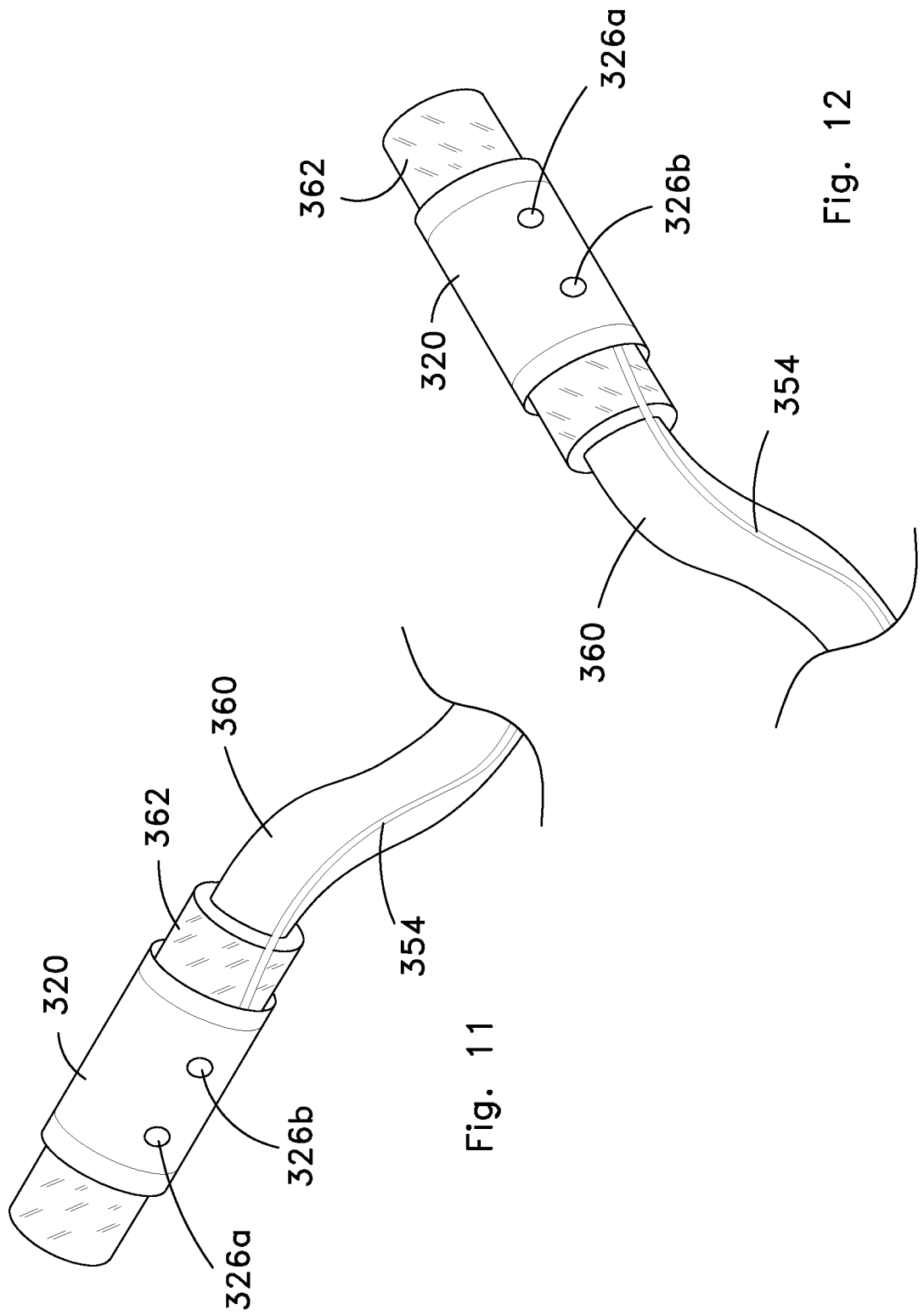

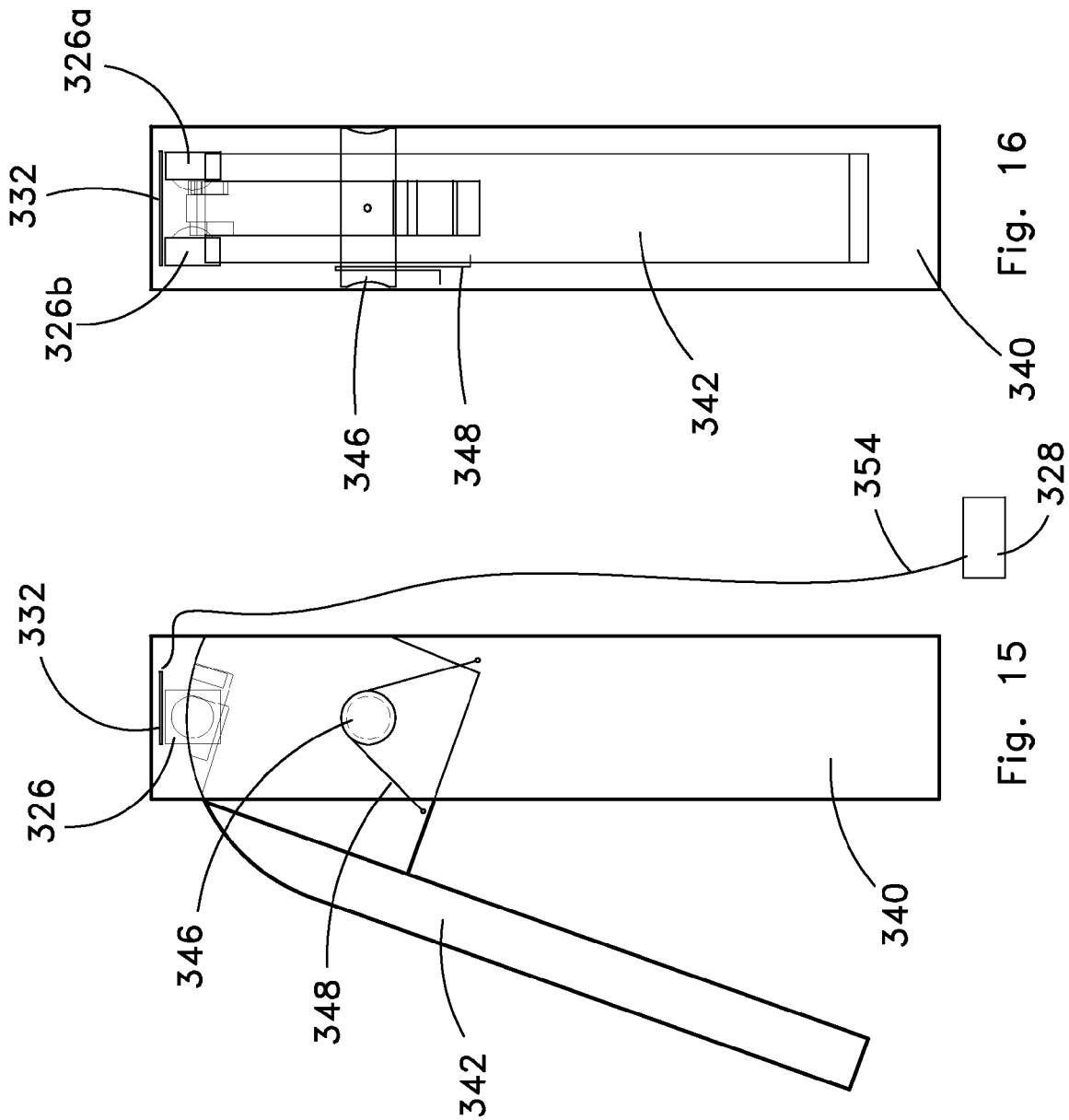

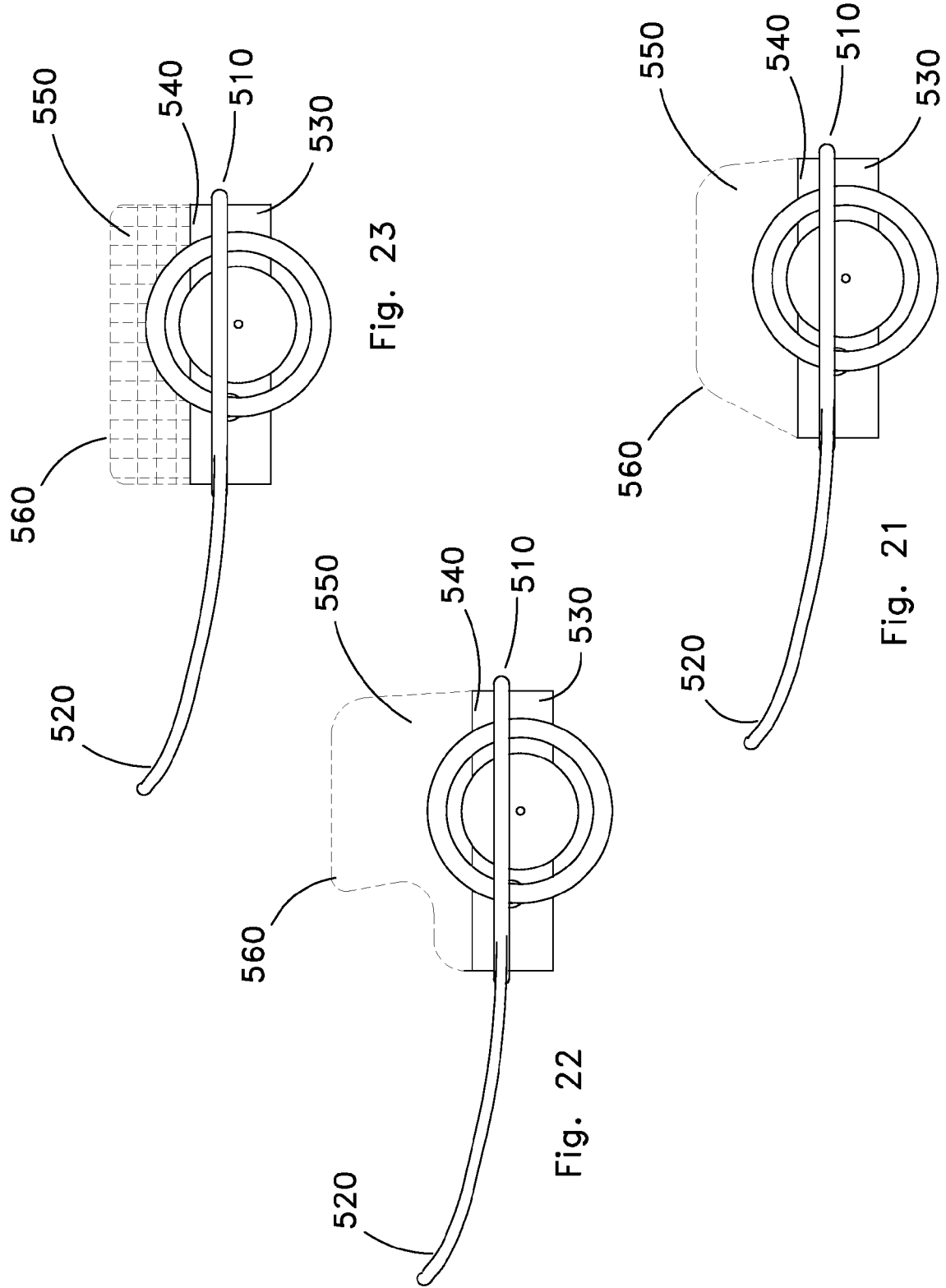

METHODS AND APPARATUS FOR UTILIZING ELECTRICALLY POWERED VEHICLES

CROSS REFERENCE TO RELATED APPLICATIONS

The present application is a continuation of and claims the benefit of priority to U.S. patent application Ser. No. 12/965,607 by Mark Wanger et al., filed Dec. 10, 2010, which in turn claims benefit of U.S. Provisional Application No. 61/179,536, filed May 19, 2009, U.S. Provisional Application No. 61/180,846, filed May 23, 2009, and U.S. Provisional Application No. 61/250,863, filed Oct. 12, 2009, all of which are hereby incorporated by reference in their entirety for all purposes as if fully set forth herein.

TECHNICAL FIELD

Generally, the inventive technology relates to utilizing electrically powered vehicles. More particularly, the inventive technology involves novel methods and apparatus for optimizing the torque and speed delivered by electric motors, diagnosing electrical faults, utilizing interchangeable trailer tops, and providing quick release throttles and related accessories. The inventive technology may be particularly suited to providing supplemental electrical power to biomechanically powered vehicles, such as bicycles or the like.

BACKGROUND

While electric vehicles may be gaining in popularity, many aspects of electric vehicle technology still may carry drawbacks capable of improvement.

A challenge with electric vehicles may be the gearing trade off. Low gearing (motor spins faster to achieve a wheel speed) may be good for starting torque to provide good acceleration and uphill or upwind capability. Using only low gearing may limit the speed of the system once the torque requirements are fulfilled. High gearing (motor spins not as fast to achieve the same wheel speed) may provide higher speed range with poorer starting torque and acceleration. High gearing may also stress a motor more when starting, because low rpm high electric currents may be sustained longer and may heat up the windings and perhaps exacerbate brush wear. Decreasing the duration of high currents may enhance motor life. Fewer motor revolutions over a distance traveled also may prolong motor life.

While transmissions (changing the ratio of motor to wheel revolutions) may be effective at adapting a motor to varying torque requirements, they often may require more mechanical devices to provide the variable coupling and thus may require a shifting mechanism. Such a system may be relatively complex and mechanical in design. In cars, manual shifting may have been removed with automatic transmissions, but the elimination of manual shifting may result in more complex controls and coupling apparatus. Simplicity may remain a valuable goal. Both reliability and user experience may benefit from simple implementation. Simplicity may be one reason that cruiser bicycles and fixed gear bicycles may be gaining in market share.

Electric bicycles may require a throttle which typically may be designed into each bicycle. Throttle designs generally may be specific to one bicycle design and its specific throttle, brake levers, and gear shifters. There may be no need to design for moving the throttle to another bicycle in such implementations.

Bicycle conversion kits may be increasing in popularity too. These kits may include conventional throttles which may mount on handle bars, perhaps sometimes requiring removal of rubber grips to slide over the handle bar, or perhaps using a thumb lever that may be ergonomically challenging with gear shifters, or possibly not fitting well around handle bar extensions. These kits may require time and skill to install on a bicycle and may not be made to be quickly moved from one bicycle to another.

Powered bicycle trailers, like bicycle conversion kits, may need a throttle that can be installed on multiple types of bicycles. Furthermore, the trailer may be able to be quickly moved to another bicycle and associatively, the owner may need to uninstall the throttle and move it to the other bicycle too.

A problem may be that bicycle handle bars may host a wide variety of grips, handle bar extensions, bells, lights, brake levers, and gear shifters (twist, thumb and finger, thumb only, and brake lever actuated). Adding yet another function to the hand area may be physically constrained and ergonomically challenging. Making a simple throttle that can work on a multitude of bicycle designs may be even more challenging.

Products like bicycle conversion kits and powered trailers may create an unanswered need. These products may only sell well into a subset of installed base bicycles, the subset on which the products may be able to be simply installed. A low cost throttle design that fits a wider variance of bicycles and can be adjusted for various hand sizes and hand position preferences may greatly expand the number of bicycles which can be sold. Additionally, a design which requires no tools for installation may be valued.

An analogous example may be hitches for bicycle trailers. Trailers may require a hitch that is compatible with a wide variety of bicycles in use. A hitch design that only works for a few bicycle styles may limit sales, while a design that fits many bicycles may expand sales. A useful feature for a bicycle trailer may be a trailer that can simply be transferred from one bicycle to another because the hitch is universal or portable. Such hitch designs may need to accommodate a range of designs including fixed frames, full suspension frames, quick release axles, and axle/nut designs, as well as bicycles with and without rear bicycle racks. Analogous features in a throttle design may be lacking in conventional bicycle designs.

Prior designs for throttles may have been intended to be mounted to a bicycle and remain, or perhaps sometimes be transferred as a part of more intensive installation process. Conventional designs may include: (1) twist throttles, which typically may require removal of rubber grips to provide a bare bar for sliding the throttle over the end and fastening with screw—these may not work with twist shifters and curved handlebars; and (2) thumb lever switches that may fit over round handle bars and may fasten with a screw or two—these may not be compatible with thumb shifters, because there may be two thumb levers in a crowded space. Conventional designs may employ potentiometers (variable resistors), hall-effect, or optical sensors which may be configured to create variable voltage signals or variable resistance signals for controllers. Thumb actuators, when placed on a bicycle with thumb shifters, may either conflict with the gear shifter or may make one of the thumb devices more difficult to use. They may not work well at all with twist gear shifters. The twist grip actuator may require removal of the handlebar grip for installation, and also may not work in tandem with a twist gear shifter.

A distinct challenge of electric vehicles may emerge from the use of electric parts and assemblies in addition to normal mechanical parts like wheels, chains, gears and brakes. Effective technicians well versed in both electronics and mechanics may be rare, and so troubleshooting and repair of malfunctioning electric vehicles may be rarely sufficient for owners and service centers.

While sales of electric vehicles may have increased over the last few years, home mechanics and bicycle shop mechanics may not necessarily have the skills and tools to deal with these products. Bicycle mechanics may be well trained in mechanics, but few may have electronic technician skills. Voltmeters and ammeters may be rare in bicycle shops as well as homes. Methodical troubleshooting guides may be rarely available and may be of little help to those not trained in basic electronics. A clever technician may be required to effectively troubleshoot and repair an electric bicycle or similar electromechanical device. And to confound the issues more, various types of motors (brush and brushless, and hub motors) and controllers may be becoming more prevalent.

When an electric vehicle stops functioning, nominally skilled owners and shop mechanics may not know if the problem is a bad battery, broken wire, or worn out motor. Many owners may be stuck with no easy way to get help. Units may be discarded prematurely out of frustration and further purchases may be delayed or dismissed. Many consumers may choose to not buy an electric vehicle when they discover that they may require days to repair.

The most prevalent state of onboard diagnostics may be indicators on electric bicycles with a series of LEDs that report the charge level of batteries. Some electric bicycles may provide error codes for a few components when there is a hard failure.

Electrical components may have been part of bicycles for decades. Lights, generators, speedometers, even complex bicycle computers may be sold and serviced by bicycle stores. Troubleshooting and repair may be based on quick (less technician time may save money and improves customer satisfaction) and simple techniques, such as perhaps swapping parts until the bad part is identified. These techniques may be designed for mechanics that do not have an electrical background. Electric bicycles and other similar vehicles may be more complex, with multiple interactive parts like motors, batteries, controllers, throttles, and other elements. Swapping parts often may be difficult, expensive, and slow, because such parts often may be more integrated into the unit. And sometimes a component may work well on the bench (not having to push a rider and bicycle) and may not perform well on the road. Swapping parts and road testing may be laborious and even more time consuming.

No Trouble Found ("NTF") may be an expensive and frustrating issue in the service business. Intermittent failures, like a wire with damaged insulation infrequently touching metal, may lead to NTF when the service technician tests the unit while the wire is not touching metal. When a product fails and the customer brings it in for repair, and then it works fine once the repair technician sees it, then the technician may have no idea what is wrong and the customer may be vulnerable to it failing again. Repeated instances of this may be especially difficult. Sometimes a technician may change some parts just to show good effort to the customer or because they may be able to guess that a certain part is the problem. These problems often may lead to expensive repairs that may not be required, and may leave the unit in a state of intermittent functionality. The issue may continue inefficiencies, because the factory may receive replaced parts that are not failed and may not be able to identify the right issue to redesign.

Conventional practice for troubleshooting electric vehicles may be exemplified by bicycle shop mechanics that service state of the art electric bicycles. They may check battery level, and then may try to guess which component to replace and test to see if it fixes a problem. Most bicycle technicians may not use voltmeters or ammeters. In more unique situations, a technician trained in simple electronics may use voltmeters, ammeters, and a series of replacement parts, to identify a problem. Technicians may try methods like: measure battery voltage; wire the motor directly to the battery to see if it spins; or replace a throttle to see if the new one works. Local bicycle shops whose customers bring in electric bicycles or scooters may either call in a qualified technician, train an employee, or have to deny service to the customer for fear of disappointing them. The current state of diagnosis in bicycle shops may illustrate how technologies and practices in other fields may not have been applied to electric vehicles.

Bicyclists oft may need to carry things with them, and these things can be of notable volume or weight. Panniers or saddle bags may be examples of how riders cope with these needs. Bicycle trailers may be employed in many forms including trailers for children, cargo, and pets. These trailers may be single form designs perhaps with an intended purpose, but perhaps often used for other purposes. For example, a child carrying trailer may be used for carrying cargo. Conversely, however, a trailer designed for carrying cargo may be unsafe to use to carry children.

An unmet need may be to be able to re-purpose a trailer for another use without having to purchase an entirely new trailer. Few people may want to have, for example, three separate trailers for different uses like carrying a child, carrying cargo such as hardware or lumber, and commuting with a professional-looking trailer.

The foregoing problems related to conventional electric vehicles may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY DISCLOSURE OF THE INVENTION

The inventive technology relates to methods and apparatus for utilizing electrically powered vehicles and in embodiments may include the following features: techniques for differentially controlling multiple electric motors having different effective gear ratios; techniques for detecting and transdisciplinarily processing electrically recondite operation parameters; techniques for multiply purposing an electrically propelled trailer base; techniques for quickly mounting and removing a hand actuated accessory to a biomechanically powered vehicle. Accordingly, the objects of the methods and apparatus for utilizing electrically powered vehicles described herein address each of the foregoing in a practical manner. Naturally, further objects of the inventive technology will become apparent from the description and drawings below.

BRIEF DESCRIPTION OF THE DRAWINGS

FIG. 7 is a top view of a removable throttle in one embodiment.

FIG. 8 is a side view of a removable throttle in one embodiment.

FIG. 11 is a perspective view of a reversible removable throttle in a first adjusted position on a handlebar in one embodiment.

FIG. 12 is a perspective view of a reversible removable throttle in a second adjusted position on the handlebar of FIG. 11 in one embodiment.

FIG. 15 is a top view of a bar end insert removable throttle in one embodiment.

FIG. 16 is a side view of a bar end insert removable throttle in one embodiment.

FIGS. 21-23 are illustrations of multipurposed modular interchangeable trailer tops in one embodiment.

MODES FOR CARRYING OUT THE INVENTION

Figure 1:
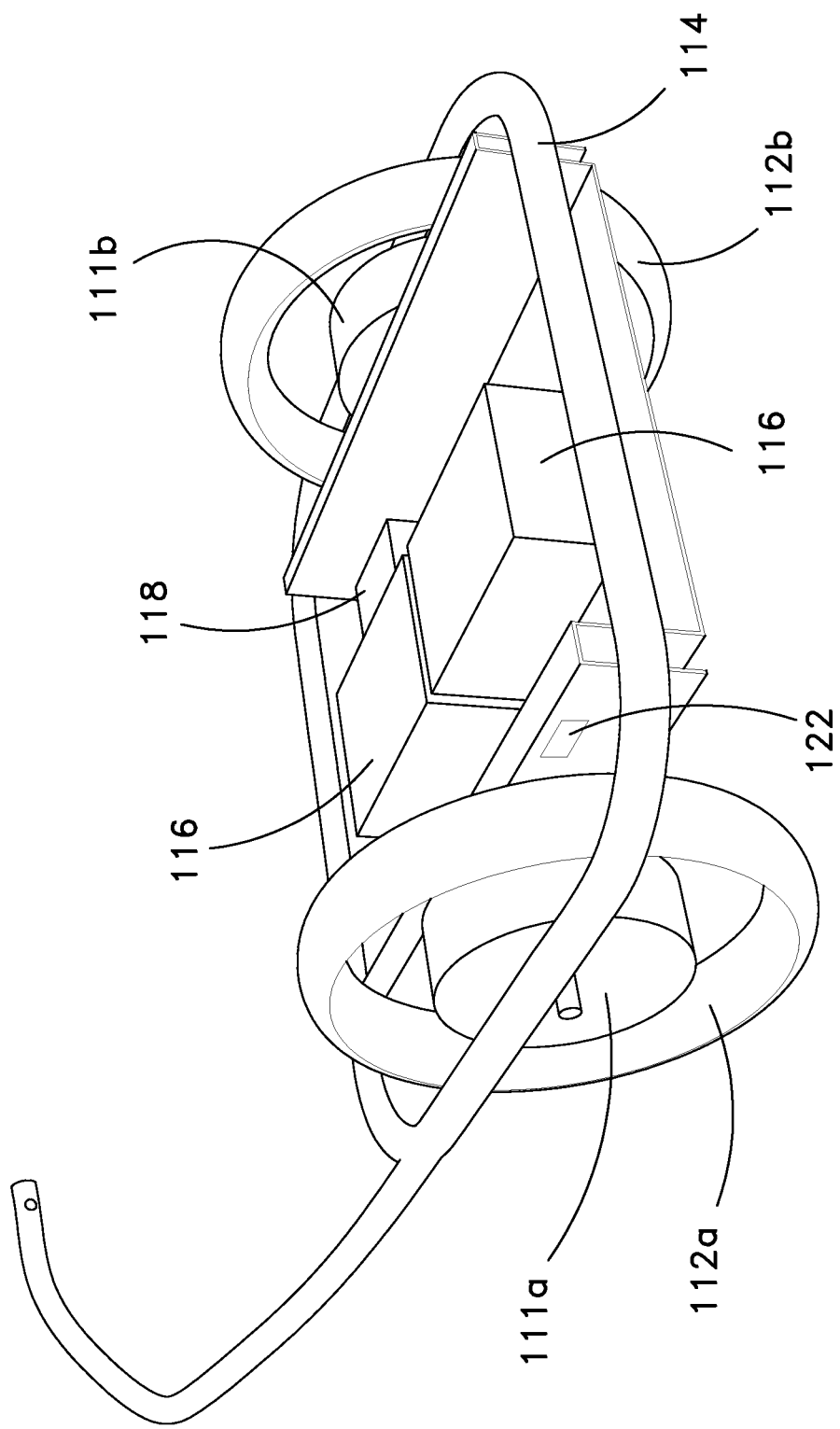
FIG. 1 is a perspective view of a supplemental electric propulsion trailer having a first electric hub motor and a second electric hub motor in one embodiment.

As mentioned earlier, the present inventive technology includes a variety of aspects, which may be combined in different ways. The following descriptions are provided to list elements and describe some of the embodiments of the present inventive technology. These elements are listed with initial embodiments, however it should be understood that they may be combined in any manner and in any number to create additional embodiments. The variously described examples and preferred embodiments should not be construed to limit the present inventive technology to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

As used herein, the term "responsive" should be understood to indicate a relationship between two or more elements wherein an action undertaken with respect to one element is capable of causing an effect in another element.

The inventive technology may be applied to a biomechanically powered vehicle in various embodiments. Biomechanical power may include any of various kinds by which human power may be harnessed and utilized to power a vehicle, such as by foot pedaling, hand cranking, or the like. Examples of such vehicles may include bicycles, recumbent bicycles, bicycle conversions, trailers, scooters, wheelchairs, and the like.

Now with reference primarily to FIGS. 1-6, various embodiments of the inventive technology may utilize a supplemental electrical propulsion apparatus for a biomechanically powered vehicle. Such an apparatus may propel the vehicle to supplement, or perhaps even substitute for, the biomechanical power.

The supplemental electrical propulsion apparatus may have an electrical power source (116) (denoted particularly as a "battery" in the embodiment of Example 1). Any source capable of providing electrical power consistent with the principles discussed herein may be utilized, such as batteries, fuel cells, solar cells, electrical outlets, or the like.

The electrical power source (116) may put out electrical power to a responsive differential power output controller (118) (denoted particularly as a "controller" in the embodiment of Example 1), which may receive such output power and differentially control its allocation to various components of the supplemental electrical propulsion apparatus. Such differential control may involve allocating all of the power output, none of the power output, or any fraction of the power output to any single component or combination of components, including either sequentially or simultaneously, as may be appropriate consistent with the principles discussed herein.

For example, the differential power output controller (118) may allocate power to one or more electric motors. Such electric motors may be of any type sufficient to create motive sufficient to power the biomechanically powered vehicle consistent with the principles discussed herein, such as spinning shaft electric motors, hub motors both having brushes and of brushless varieties, and the like. Embodiments may include a first electric motor (110a or 111a) (denoted particularly as "shaft motor 1" or "hub motor 1" in the embodiment of Example 1) and a second electric motor (110b or 111b) responsive to the differential power output controller (118), and (denoted particular as "shaft motor 2" or "hub motor 2" in the embodiment of Example 1), and the controller may allocate the output power to either the first electric motor (110a or 111a), the second electric motor (110b or 111b), both such motors sequentially or simultaneously, or neither of these electric motors, in various embodiments.

Each electric motor utilized by the supplemental electrical propulsion apparatus may have an effective gear ratio relating how fast the motor may spin to achieve a given wheel speed. For example, a low effective gear ratio might be characterized by requiring the motor to spin faster to achieve a given wheel speed, while a high effective gear ratio might be characterized by permitting the motor to spin not as fast to achieve the given wheel speed. As may be appreciated among those having skill in the art in mechanics, a lower effective gear ratio may permit the motor to achieve higher wheel torque, but may limit the top speed at which the motor may spin, while a higher effective gear ratio may achieve a higher top speed, but may sacrifice the amount of wheel torque created.

Accordingly, multiple electric motors may be operated at different effective gear ratios to achieve different performance characteristics for the supplemental electrical propulsion apparatus. A first electric motor (110a or 111a) may be operated at a first effective gear ratio, a second electric motor (110b or 111b) may be operated at a second effective gear ratio, a third electric motor (not shown) may be operated at a third effective gear ratio, and so forth.

Any suitable performance characteristics attainable through the use of such different effective gear ratios may be applied to the supplemental electrical propulsion apparatus. For example, in some embodiments, a first effective gear ratio may be a torque optimization gear ratio and a second effective gear ratio may be a speed optimization gear ratio. Such gear ratios may involve, respectively, optimizing the torque produced by a first electric motor (110a or 111a) and optimizing the speed produced by a second electric motor (110b or 111b). In this manner, power may be differentially allocated by the differential power output controller (118) between the first electric motor (110a or 111a) and the second electric motor (110b or 111b) depending on torque or speed needs of the vehicle. When high torque is necessary, such as to propel the vehicle from a standing start, the first electric motor (110a or 111a) may be utilized, whereas when a high speed is necessary, such as when the vehicle cruises, the second electric motor (110b or 111b) may be utilized. In some specific embodiments, a torque optimization gear ratio may be a gear ratio configured to accelerate the vehicle to 10 miles per hour in four seconds or less, and a speed optimization gear ratio may be a gear ratio configured to move the vehicle at a top speed of at least 20 miles per hour. Naturally, however, the foregoing examples are only illustrative in nature, and should not be construed to limit the effective gear ratio principles set fort herein.

In some embodiments, the differential power output controller (118) may be automated, such as wherein the allocation may be determined automatically using automated means like mechanical or electrical presets, microprocessor logic, or the like. Embodiments also may utilize a manual controller, such as wherein a human operator may control manually how power output is allocated, such as with a switch or other manual control. In various embodiments, either automated or manual, the controller may allocate power output in response to a throttle setting.

Moreover, the manner in which power output is allocated by the differential power output controller (118) may be implemented in any suitable manner consistent with the principles described herein. For example, power output may be allocated based on any of various suitable threshold criteria. In particular, the differential power output controller (118) may change the allocation of output power, such as from a first electric motor (110a or 111a) to a second electric motor (110b or 111b), when a given threshold is met or exceeded. Examples of such thresholds may include a torque threshold (such as when power may be allocated to one motor for a given torque range and to another motor for torque requirements outside of the range), a speed threshold (such as when power may be allocated to one motor for a given speed range and to another motor for speed requirements outside of the range), a throttle setting threshold (such as when power may be allocated to one motor for given throttle settings and to another motor for other throttle settings), a motor temperature threshold (such as when power may be allocated to another motor when the temperature of a first motor exceeds a certain value), a motor current threshold (such as wherein power may be allocated to another motor when the current in a first motor exceeds a certain value), a fault detection threshold (such as when power may be allocated to a different motor upon the detection of a specified fault), or indeed any threshold related to any appropriate operation parameter of the supplemental propulsion system consistent with the principles discussed herein.

Accordingly, the differential power output controller (118) may be utilized as a threshold controller in various embodiments, which may involve threshold controlling the output power of the electrical power source (116). Some embodiments may even involve using a hysteresis threshold, as wherein a fluctuating parameter may have a higher threshold when the parameter is increasing and a lower threshold when the parameter is decreasing, perhaps to create a performance tolerance so that power output is not constantly shifted when the parameter hovers near a given value.

Of course, the power output may be controlled based on any suitable criteria consistent with the principles discussed herein, and not just performance characteristics. For example, the differential power output controller (118) in various embodiments may be a motor preservation controller, as wherein power output may be allocated to preserve the functionality of one or more electric motors. In particular, it may be appreciated that electric motor functionality may be preserved or extended by decreasing stressful operation conditions, such as excessive periods of high current, excessive motor revolutions, excessive heat build up, or the like. Since power can be differentially allocated by the differential power output controller (118) among different electric motors, it may be possible to minimize such stressful conditions in any one motor. In this way, the differential power output controller (118) may be a current minimization controller, motor revolution minimization controller, heat minimization controller, or the like.

In various embodiments, a supplemental propulsion apparatus may utilize a differential vehicular drive train. The drive train may include all components necessary to transfer motive power from the motors to which the drive train may be responsive, such as a first electric motor (110a or 111a) and a second electric motor (110b or 111b), to the drive wheel or wheels, such as a first drive wheel (112a) (denoted particularly as "wheel 1" in the embodiment of Example 1) and a second drive wheel (112b) (denoted particularly as "wheel 2" in the embodiment of Example 1). Accordingly, differentially driving the vehicle may involve transferring all such motive power, no such motive power, or any fraction of such motive power from any single such motor or any combination of such motors, including either sequentially or simultaneously, as may be appropriate consistent with the principles discussed herein. Naturally, differentially driving the vehicle in this manner may involve doing so at the respective gear ratios of all electric motors to which the drive train may be responsive.

Naturally, the drive train may be configured in any suitable manner to drive the vehicle as appropriate consistent with the principles discussed herein. For example, some embodiments may utilize dedicated drive wheels, as wherein a first dedicated drive wheel may be singularly responsive to a first electric motor, a second dedicated drive wheel may be singularly responsive to a second electric motor, a third dedicated drive wheel may be singularly responsive to a third electric motor, and so forth. Where embodiments may utilize a different effective gear ratio for each such electric motor, it may be seen that each drive wheel may offer different performance characteristics, such as perhaps torque optimization or speed optimization, and the differential power output controller (118) may allocate power to differentially drive the dedicated wheels with the appropriate motors based on the performance needs of the vehicle.

By way of comparison, some embodiments may utilize a single drive wheel responsive to multiple electric motors. A shift element, such as perhaps a transmission or the like, may be utilized to shift power from each electric motor to the drive wheel as appropriate. Where the electric motors again operate at different effective gear ratios, for example, shifting among the electric motors can be accomplished to meet performance needs of the vehicle, such as torque optimization or speed optimization. Of course, as noted above, these examples are only illustrative in nature, and should not be construed to limit the drive train configuration principles set fort herein.

Moreover, the supplemental electrical propulsion apparatus may be implemented on a vehicle in any suitable configuration consistent with the principles discussed herein. Some embodiments, for example, may implement the apparatus as a supplemental electric propulsion trailer (114) (denoted particularly as a "trailer chassis" in the embodiment of Example 1) connected to a biomechanically powered bicycle (250). In such embodiments, the trailer may electrically propel the bicycle. In other embodiments, the apparatus may be implemented as a supplemental electric propulsion bicycle (not shown) having a first wheel responsive to a first electric motor having a first gear ratio and a second wheel responsive to a second electric motor having a second gear ratio. Such embodiments may involve driving the bicycle wheels with the motors a different effective gear ratios. Naturally, the examples here are only illustrative in nature, and should not be construed to limit the manner in which the supplemental electrical propulsion apparatus may be implemented on a vehicle.

Now with reference primarily to FIGS. 17-20, various embodiments of the inventive technology may utilize an electrical fault diagnostic apparatus for a supplemental electric propulsion system for a biomechanically powered vehicle. The apparatus may enable the diagnosing of electrical faults in such a supplemental electric propulsion system.

A supplemental electric propulsion system may provide electrical propulsion to supplement biomechanical power in a biomechanically powered vehicle, perhaps such as described elsewhere herein. Such systems may be established on the biomechanically powered vehicles themselves, such as perhaps integrated with a bicycle, or perhaps may be provided for in components that may be used with biomechanically powered vehicles, such as perhaps via an attached trailer or the like.

A supplemental electric propulsion system in various embodiments may have one or more electrical components. Specifically referencing FIGS. 17 and 20, for example, such components may include, but are not limited to: batteries (420a and 420b); fuses (422); current interrupters (424); power switches (426); drive motors (428); motor power controllers (430); brake sensors (434); throttles (438); diagnostic system controllers (440); clocks (442); battery chargers (444); battery controllers (446); current sensors (450a and 450b); motion sensors (452); temperature sensors (454); and similar devices such as switches, circuit breakers and the like.

These components may operate at one or more electrically recondite operation parameters, as wherein such parameters may operate according to principles or methodologies particularized to the field of electrical engineering or related disciplines. Naturally, the knowledge and skills required to properly understand and work with these electrically recondite operation parameters may be beyond the knowledge or understanding of the ordinary person, and in general may be possessed perhaps only by persons having skill in electrical engineering or related disciplines. Persons not specifically trained in such fields may not have the background necessary to diagnose and repair such electrical components. These persons perhaps may include typical bicycle mechanics, whose training generally may not extend to fields such as electrical engineering or related disciplines.

Examples of electrically recondite operation parameters in various embodiments may include, but are not limited to, a voltage parameter, a current parameter, a power parameter, a resistance parameter, and the like. The recondite nature of these conditions perhaps may be further appreciated by noting that specialized tools may be required to work within these parameters, such as perhaps voltmeters, ammeters, watt meters, ohmmeters, and the like, such tools perhaps not generally utilized excepts by persons having skill in the field of electrical engineering or related disciplines, and such persons perhaps generally not being bicycle mechanics. In some embodiments, an electrically recondite operation parameter may be specific to electric vehicles, such as perhaps a throttle signal. Aspects of throttle signals may be more fully discussed in Example 3.

An electrically recondite operation parameter in various embodiments may be a contact connection status, as wherein electrical connections may exist within or among an electrical component or components. Naturally, an electrical connection must maintain sufficient contact for proper current flow, or a fault may arise manifesting, for example, as a failure of current to flow, an intermittent current flow, a short, or the like. This problem may be exacerbated for electrical connections that are subject to frequent connection and disconnection, such as plug-in connections or the like that may be connected and disconnected by hand. Throttles may be one example of an electrical component utilizing a plug-in connection, as may be discussed more fully for example in Example 3. Nevertheless, contact connection statuses may exist in any type of electrical connection not just limited to plug-in electrical components, and may be particularly important in electrical safety components (such as throttles, fuses, brake sensors, fail-safes, and the like) and electrical operational components (such as throttles, batteries, fuses, switches, current interrupters, electric motors, electric motor power controllers, chargers, and the like).

Various embodiments may utilize one or more electrical diagnostic elements configured to detect specified electrically recondite operation parameters in the electrical components of the biomechanically operated vehicle. Any suitable device capable of detecting an electrically recondite operation parameter consistent with the principles discussed herein may be utilized, for example including, but not limited to, voltmeters, ammeters, watt meters, ohmmeters, and the like. Specifically referencing FIGS. 17 and 20, for example, electrical diagnostic elements may be used to measure electrically recondite operation parameters such as: the battery voltages at (482a), 482(b), 482(c), and 482(d); the fuse voltage at (486), the switch voltage at (488), the current interrupt voltage at (490); the motor voltage at (492), the battery controller voltage at (496), and the current at (450a) and (450b). Further examples may involve detecting the status of a contact connection as previously discussed, including perhaps detecting the status of a plug-in contact connection, detecting the status of a plug-in throttle contact connection, detecting the status of an electrical safety component contact connection, detecting the status of an electrical operational component contact connection, and the like.

An electrical diagnostic element in various embodiments may include a pre-component electrical diagnostic element and a post-component electrical diagnostic element. These may be placed before and after an electrical component, respectively, such as to detect the difference in an electrically recondite operation parameter before and after the electrical component. Such before-and-after parameters may include, for example, but are not limited to, pre-component and post-component voltage and pre-component and post-component current. The before-and-after parameters also may be used to determine information about the electrical component situated between the pre-component and post-component electrical diagnostic elements, such as component power, resistance, or the like.

Detecting such changes in parameter across the component may provide diagnostic data indicative of the operating condition of the component. As but one example, with specific reference to FIG. 17, a pre-component electrical diagnostic element may be placed before fuse (422) and a post-component electrical diagnostic element may be placed after fuse (422), wherein the diagnostic elements may be configured to measure a voltage parameter. As those with skill in the field of electrical engineering or related disciplines may appreciate, if there is a significant difference in the voltage parameter measurement before and after the fuse, this may indicate the fuse is impaired or has failed. Further examples pre-component and post-component electrical diagnostic elements may be set forth in Example 3. Regardless, the examples set forth herein are for illustrative purposes only, and should not be construed to limit the pre-component and post-component diagnostic principles disclosed.

Figure 17:
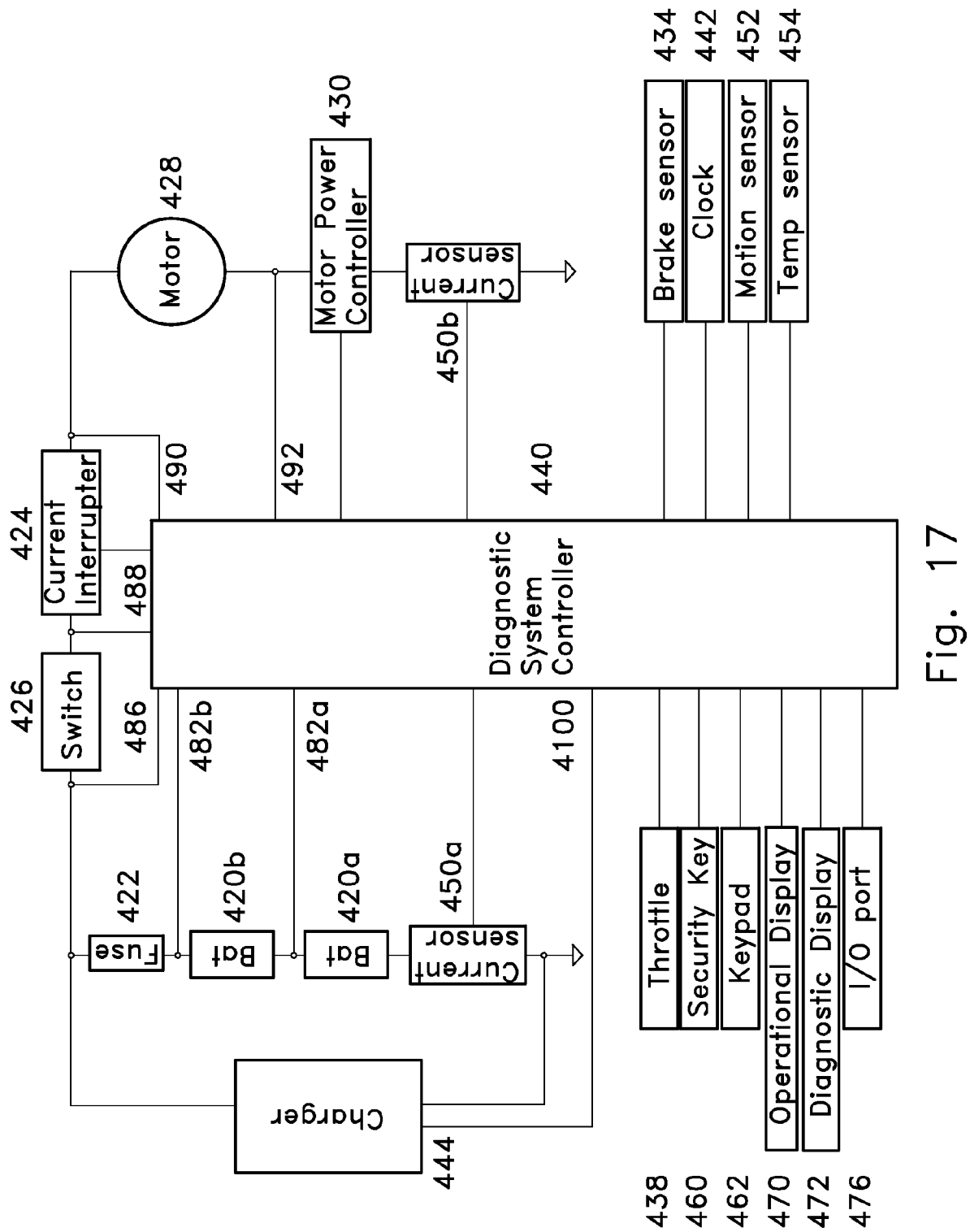
FIG. 17 is a block diagram of a transdisciplinary diagnostic processor architecture in one embodiment.
Figure 20:
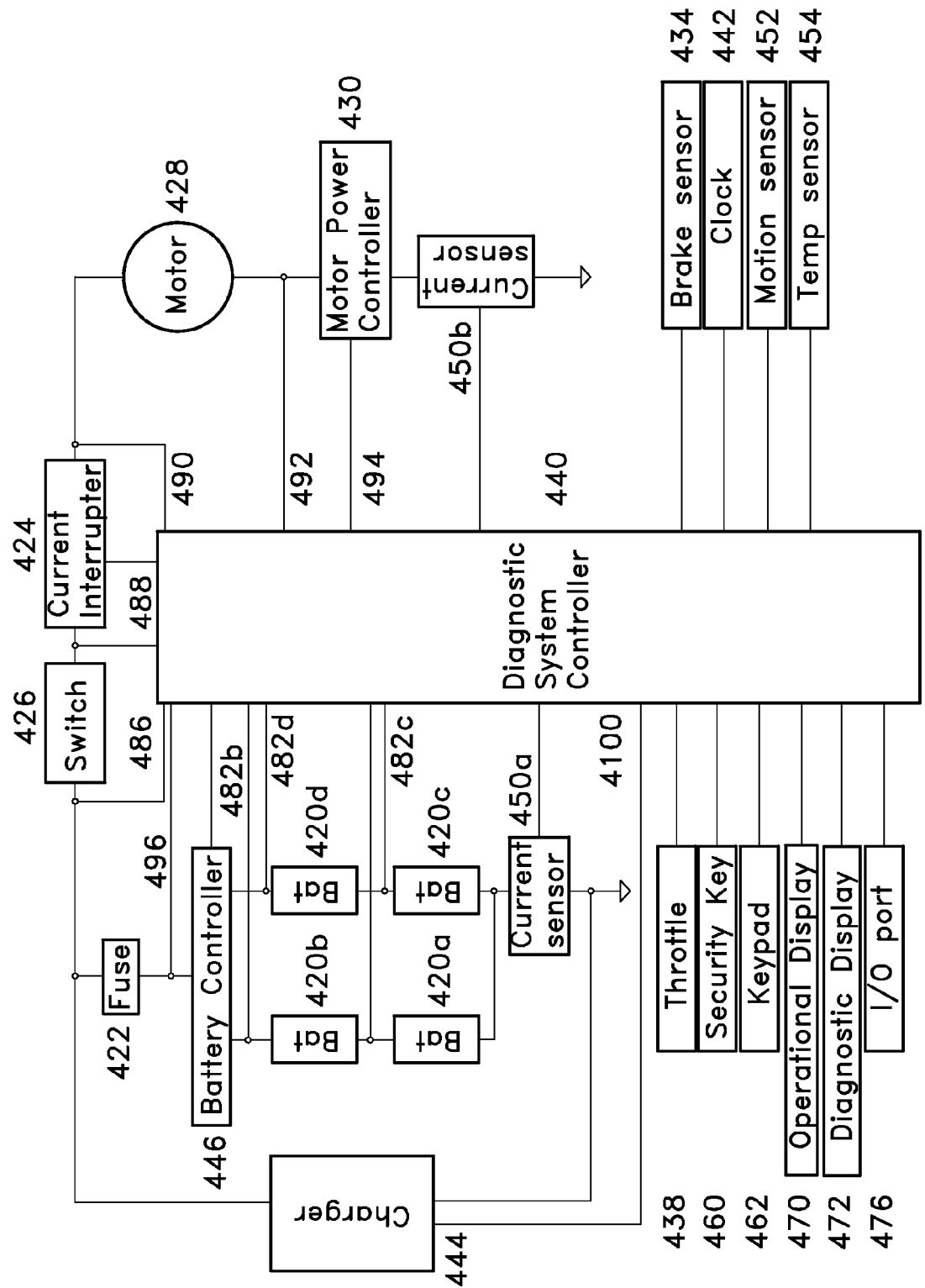
FIG. 20 is a block diagram of a parallel battery configuration in one embodiment.

As can be seen from FIGS. 17 and 20, the electrical components of a biomechanically powered vehicle may create a complex electrical system. Naturally, multiple pre-component electrical diagnostic elements and multiple post-component electrical diagnostic elements may be utilized to detect multiple pre-component electrically recondite operation parameters and multiple post-component electrically recondite operation parameters as well as the electrically recondite operation parameters of multiple components themselves. These multiple diagnostic elements may be arranged in any configuration and may interact in any manner consistent with the principles discussed herein. For example, the multiple diagnostic elements may be configured in a fault isolation arrangement, such as to isolate a fault potentially manifested across several electrical components to the actual problem-causing component or components. As but one example, with specific reference to FIG. 17, a faulty motor (428) may be isolated by detecting voltages at (490) and (492), but the fault may be further isolated to a faulty motor power controller (430) by utilizing a current detected by current sensor (450b). Further examples of multiple pre-component and post-component electrical diagnostic elements arranged in a fault isolation arrangement may be provided in Example 3. Regardless, the examples set forth herein are for illustrative purposes only, and should not be construed to limit the multiple pre-component and post-component diagnostic principles disclosed.

In various embodiments, an electrical fault diagnosis apparatus may utilize a transdisciplinary electrical diagnostic processor (440) (denoted particularly as a "diagnostic system controller" in the embodiment of Example 3) responsive to one or more electrical diagnostic elements. The processor may receive information from the electrical diagnostic elements and process the information to produce a diagnostic output, such as perhaps a diagnosis of the operating condition of the electrical components. In a relatively simple form, such diagnostic output simply may be a status of the component as working of failed, though naturally more sophisticated diagnostics are possible for sophisticated processors, electrical diagnostic elements, and electrical components. Any device capable of executing such diagnostic processing consistent with the principles discussed herein may be utilized as a transdisciplinary electrical diagnostic processor (440). In various embodiments the processor may be a suitably programmed microprocessor, though this should not be construed to limit the devices capable of achieving such diagnostic processing.

The transdisciplinary nature of the processor may implicate taking recondite information and making it usable to persons outside of the recondite discipline from which the information originates. As mentioned earlier, for example, aspects of the inventive technology may utilize electrically recondite operating parameters of electrical components on biomechanically powered vehicles. These electrically recondite operating parameters may not be readily usable by persons not having training or experience in the field of electrical engineering or related disciplines. The transdisciplinary electrical diagnostic processor (440) may process such electrically recondite operating parameters into diagnostic output usable by such persons. In particular, such persons may include bicycle mechanics, who may not have background or training in electrical engineering or related disciplines.

As but one example, as previously described earlier herein with specific reference to FIG. 17, a voltage parameter may be detected before and after fuse (422). Before processing by the transdisciplinary electrical diagnostic processor (440), this information may be in an electrically recondite form, such as perhaps an indication of a voltage difference of greater than 2 volts across the fuse while the current is at 0 amps. To one skilled in the field of electrical engineering or a related discipline, this information may rather straightforwardly indicate that the fuse has failed and needs to be replaced. To one not having training or experience in such fields or disciplines, this information may not have any intelligible meaning, and no understanding that the fuse has failed may be achieved. The transdisciplinary electrical diagnostic processor (440) may take such an electrically recondite operation parameter—in this case the greater than 2 volt differential across the fuse while the current is at 0 amps—and transdisciplinarily process it to provide useful diagnostic information to a person not skilled in the field of electrical engineering or related disciplines—such as perhaps by indicating that fuse has failed and needs to be replaced. Further examples of transdisciplinary processing may be provided in Example 3. Regardless, the examples set forth herein are for illustrative purposes only, and should not be construed to limit the transdisciplinary processing principles disclosed herein.

Naturally, various embodiments may utilize a transdisciplinary diagnostic output responsive to the transdisciplinary electrical diagnostic processor (440). The output may take transdisciplinarily processed diagnostic information and provide it to a user. Any device suitable for communicating the transdisciplinarily processed information to a user may be utilized, such as visual displays, audible messages, wired or wireless communications, links to remote computers, transfers by memory card, or the like. For example, in various embodiments the transdisciplinary diagnostic output may be a specific part test indicator (such as indicating to a user that a specific part may need to be tested), a specific part replacement indicator (such as indicating to a user that a specific part to replace), a specific diagnostic checklist indicator (such as indicating a specific checklist that a user should complete to properly diagnose a fault), or the like, although these examples are only illustrative in nature and should not be construed to limit the form or function of a transdisciplinary diagnostic output consistent with the principles discussed herein.

A transdisciplinary electrical diagnostic processor (440) in various embodiments may utilize a fault condition evaluation subroutine and a prestored fault criterion comparator. The fault condition evaluation subroutine may identify actual operating values for electrically recondite operational parameters that may be correlated to a fault condition. The prestored fault criterion comparator may store baseline values for the electrically recondite operational parameters that have been previously determined. The two elements may work in tandem to evaluate for a fault condition by comparing actual operating values to prestored fault criteria. Such prestored fault criteria may be selected to reflect any benchmark condition of an electrical component to which the actual operating condition of the electrical component can be compared. For example, the prestored baseline values may represent nominal operating conditions, optimal operating conditions, impaired operating conditions, failed operating conditions, and the like.

In some embodiments, the fault condition evaluation subroutine may utilize a system test signal. The signal may be any electrical property, such as a current, voltage, amplitude, or the like, that may be transmitted to one or more electrical components so as to determine information about such electrical components. As but one example, with reference specifically to FIG. 17, a current passed through the electrical system may pass through motor (428). If the motor is in working condition, the current may be expected to cause the motor to operate. If the motor does not operate, then it may be inferred that a fault exists at the motor. Further examples of transmitting a system test signal may be set forth in Example 3. Naturally, the system test signal may be transmitted through the entire electrical system, perhaps testing all or substantially all electrical components in the system at once. Regardless, the examples set forth herein are for illustrative purposes only, and should not be construed to limit the system test signal principles disclosed.

A system test signal may be a low power test signal in some embodiments. Transmitting the system test signal at a low power may be desirable in circumstances where it may be undesirable to operate the electrical components of the system at normal operating values for parameters such as current, voltage, or the like. During bench testing, for example, it may be important to keep parameters such as current or voltage within safety guidelines, and during vehicle start-up, for example, it may be important to prevent the vehicle from sudden unintended starts or stops. Accordingly, examples of transmitting a low power system test signal may involve transmitting a current below a safety threshold, transmitting a current below a vehicle motion threshold, transmitting for less than an appropriate time duration, such as perhaps 50 milliseconds, 100 milliseconds, or the like, and so forth. Naturally, these examples are merely illustrative, and should not be construed to limit the forms and functions which a low power system test signal may take. Moreover, the baseline values stored in the prestored fault criterion comparator naturally may be calibrated to the low power system test signal, such as to compare to a nominal operation value for a specified electrical component at such a low power system test signal.

Of course, the system test signal may be initiated at any appropriate time. Examples may include an automated system test signal (such as automatically transmitting the system test signal based on automated criteria programmed into a transdisciplinary electrical diagnostic processor (440)), a power-up system test signal (such as transmitting the system test signal whenever the electrical system is powered up), an on-demand system test signal (such as transmitting the system test signal on demand of a user, such as perhaps a bicycle rider or repair technician), and the like.

A transdisciplinary electrical diagnostic processor (440) may be configured to utilize any suitable diagnostic logic consistent with the principles described herein. For example, in some embodiments, the processor may be a non-binary logic processor. Processing with non-binary logic may enable the processor to diagnose complex diagnostic states in one or more electrical components. Rather than simply processing to diagnose a component as nominal or failed, for example, intermediate operation conditions may be capable of diagnosis. With specific reference to FIG. 17, for example, if the electrically recondite operation parameters for a fuse (422) are a voltage differential greater than 2 volts and a resistance differential between 0.1 ohms and 1 ohm, the fuse may be in an intermediate state of being impaired while not yet having failed. Accordingly, processing with non-binary logic may involve processing for a nominal operation condition, processing for an impaired operation condition, processing for a failed operation condition, and the like. Further examples of processing with non-binary logic may be set forth in Example 3. Regardless, the examples set forth herein are for illustrative purposes only, and should not be construed to limit the non-binary logic principles disclosed. Of course, an electrical diagnostic element in various embodiments may be a non-binary threshold sensor, as wherein the electrical diagnostic element may be capable of sensing electrically recondite operation parameters at a non-binary threshold or thresholds, so as to deliver appropriate non-binary sensed information to the transdisciplinary electrical diagnostic processor (440).

In various embodiments, an electrical fault diagnosis apparatus may utilize a substantially comprehensive fault diagnostic processor responsive to one or more electrical diagnostic elements. The processor may receive information about a comprehensive set of the electrical components of the biomechanically powered vehicle and process the information to produce diagnostic output. In various embodiments, such a comprehensive set may be all or substantially all of the components of the vehicle, or perhaps all or substantially all of a subset of the components of the vehicle. Subsets of components may be selected, for example, to reflect important functions, such as electrical safety components, electrical drive train components, electrical power components, electrical operational components, and the like. Substantially comprehensively diagnosing also may involve the level of sophistication with which electrically recondite operation parameters are processed. For example, comprehensiveness may be achieved by processing for multiple electrically recondite operation parameters, perhaps even processing interactions among such parameters to achieve second-level information not otherwise directly measured or measurable.

Embodiments also may utilize a diagnostic log compiler responsive to a processor, such as the transdisciplinary electrical diagnostic processor (440) or the substantially comprehensive fault diagnostic processor. The compiler may create a log of the data processed by the processor. Compiling a diagnostic log in this manner may create useful diagnostic information, such as perhaps creating a record of the time a fault occurred, the various electrically recondite operation parameters when a fault occurred, and the like. Such information may be diagnostically useful, for example, when an intermittent fault cannot be recreated at a later date and a repair technician may consult the log for further information. Further examples of compiling a diagnostic log may be provided in Example 3. Regardless, the examples set forth herein are for illustrative purposes only, and should not be construed to limit the diagnostic log compiler principles disclosed herein.

Now with reference primarily to FIGS. 21-23, various embodiments may utilize a multipurpose electrically propelled trailer base apparatus. The apparatus may allow for the multiple purposing of an electrically propelled trailer base, as wherein for example a trailer base may have a common infrastructure for connecting to a vehicle and providing supplemental electric propulsion, but also may permit the trailer to serve one or more additional functions.

The trailer base apparatus naturally may have a trailer chassis (510), such as to provide the frame, wheels, platform, and other elements of the trailer. The trailer base apparatus further may have a vehicle interconnection coupler (520), such as to enable the trailer chassis (510) to be connected to various vehicles, such as perhaps the biomechanically powered vehicles described herein. The vehicle interconnection coupler (520) in various embodiments may be standardized, such as by having interconnection hardware designed to connect with complementary standardized hardware on a variety of different types of vehicles, to permit the trailer base apparatus perhaps to be used with a variety of vehicles. An electrical propulsion system (not shown), perhaps of the type discussed elsewhere herein, may be supported on the trailer chassis (510) at a non-modular position (530) of the chassis. The non-modular position (530) may be a position of the trailer chassis (510) housing the common infrastructure of the trailer. Embodiments may include an electrical vehicle propulsion connection joined to the trailer chassis (510) by which the electrical propulsion system may be controlled from the vehicle, such as perhaps a throttle or the like.

A standardized modular interface (540) may be supported on the trailer chassis (510), perhaps as part of the trailer's common infrastructure, and configured to accept multipurposed modular interchangeable trailer conversions (560) at an interchange position (550) of the trailer chassis (510).

Trailer conversions (560) may be implemented as a physical structure tending to change, transform or convert the trailer from one purpose to another. The conversion may utilize the non-modular position (530) of the trailer to convert the non-modular position (530) from one use to another. Unlike the mere attachment of an accessory to a trailer, such as saddle bags, water bottles, or the like, the trailer conversion (560) may utilize a substantial portion of the trailer's carrying capacity, structure, chassis, space, or the like. For example, the non-modular position (530) of the trailer may represent a substantial area of the trailer which may be repurposed to change the trailer's functionality. A trailer conversion (560) in various embodiments, for example, may be a trailer top, a trailer undercarriage, a trailer side extension, or the like.

The standardized modular interface (540) may have standardized hardware designed to connect with complementary standardized hardware on the trailer conversions (560), for example to permit a variety of trailer conversions (560) to be joined to the interface. Any suitable element of the interface may be designed in any standardized manner consistent with the principles discussed herein. For example, a mechanical interface may have standardized mechanics, such as a mechanical fastener, a magnetic fastener, an adhesive fastener, a frictional fastener, a flat base having hold-down straps, an interlocking post and hole pattern, magnetic latches, hinge and latch combinations, or the like. Similarly, an electrical interface may have standardized electronics, such as perhaps an electrical fastener, or to create perhaps an electric power interface, an electric light interface, an electric audio interface, a manually connected electric interface, an automatically connected electric interface, and aligned set of electrical contacts, a wireless communication interface, or the like. Naturally, these examples are illustrative in nature and should not be construed to limit the standardized interfaces which may be implemented consistent with the principles discussed herein.

The multipurposed modular interchangeable trailer conversions (560) may be designed to serve multiple purposes. Any specific purpose or combination of purposes to which a trailer conversion (560) may be designed consistent with the principles described herein may be utilized. Examples of the purposes for which a trailer conversion (560) may be designed may include carrying a child, carrying a pet, carrying cargo, providing an aerodynamic profile, providing a lid by which the non-modular position (530) of the trailer chassis (510) may be accessed, providing a stylized look, towing a bicycle with a hitch or the like, displaying an advertisement, supporting an extra power unit, supporting wireless communications equipment, and the like. In some embodiments, the trailer conversion (560) may serve as a cover for the electrical propulsion system (not shown) of the trailer base apparatus. However, these examples are merely illustrative, and should not be construed to limit the multiple purposes to which a trailer top may be designed consistent with the principles set forth herein.

Modularity may be achieved by providing the trailer conversions (560) as modular units amenable to ready interchange with the trailer base apparatus at the standardized modular interface (540). The trailer chassis (510) may have a corresponding interchange position (550) at which the standardized modular interface (540) is located to accept the trailer conversions (560). In some embodiments, the interchange position (550) may be a trailer top position and the common infrastructure may be located at a trailer base position, perhaps such that the multipurposed modular interchangeable trailer conversions (560) ride on the trailer above the trailer's common infrastructure.

Accordingly, a trailer base apparatus in various embodiments may be utilized by selecting a specifically purposed modular interchangeable trailer conversion (560), joining the trailer conversion (560) to a standardized modular interface (540), coupling the trailer chassis (510) to a vehicle, and electrically propelling the vehicle with the electrical propulsion system (not shown) of the trailer chassis (510).

Now with reference primarily to FIGS. 6-16, various embodiments of the inventive technology may utilize a hand actuated accessory mount. The mount may allow for the mounting of a hand-actuated accessory on a biomechanically powered vehicle.

Hand actuated accessories (326a or 326b) (denoted particularly as a "button A" and "button B" in the embodiment of Example 2) may include throttles, lights, bells, speedometers, odometers, trip computers, or indeed any devices susceptible to hand operation. With respect to biomechanically powered vehicles, such accessories naturally may be mounted in areas where the operator's hands may be. Often, this may be a control surface (360) (denoted particularly as a "handle bar" in the embodiment of Example 2) of the vehicle, such as perhaps handlebars of a bicycle or the like.

Various embodiments may utilize a support structure (320) (denoted particularly as a "fabric base" in the embodiment of Example 2) configured to hold a hand actuated accessory (326a or 326b). The support structure (320) may be of any design sufficient to securely hold a hand actuated accessory (326a or 326b) situated to be held thereto consistent with the principles discussed herein. For example, in some embodiments the support structure may be a fabric base sewn about the hand actuated accessory (326a or 326b). The support structure in various embodiments also may allow for the hand actuated accessory (326a or 326b) to be proximately placed to a control surface (360), such as for example within hand reach, so the operator of the vehicle may have ready access to the hand accessory (326a or 326b) simply by having access to the control surface (360).

Ergonomic principles may be applied to the support structure (320) in various embodiments. For example, a support structure (320) may be implemented as an ergonomic compatibility clearance structure, such as to ergonomically compatibly clear various components of a control surface (360). In particular, components such as handbrakes, gear shifters, hand grips, handle bar extensions, bar ends, bells, lights, displays, and the like, may require enough room on a control surface (360) to themselves be hand operated. The support structure (320) may achieve ergonomic compatibility with such components by having dimensions to clear the space required for their operation, while still preserving enough space to operate the hand actuated accessory (326a and 326b) held in the support structure (320). In some embodiments, for example, the support structure (320) may have a low profile suitable to ergonomically compatibly clear other components on a control surface (360). The low profile may be implemented in any suitable manner, such as perhaps establishing the support surface (320) as relatively flattened, allowing the support structure (320) to conform to the manual control surface, and utilizing slim or flattened controls on the hand actuated accessory (326a and 326b) such as buttons, sliders, pads, or the like. Further examples of support structures (320) may be discussed in Example 2. Naturally, these examples are illustrative only, and should not be construed as limiting the ergonomic compatibility clearance principles described herein.

The support structure (320) further may have a mounting surface configured to engage the control surface (360) of the biomechanically powered vehicle. In various embodiments, the mounting surface may be an accommodative surface configured to accommodate a wide variety of control surfaces (360), including but not limited to accommodating mountain bike style handle bars, cruiser bike style handlebars, recumbent bike style handle bars, curved style handle bars, straight style handlebars, and the like.

Accommodation may be implemented in any suitable manner consistent with the principles disclosed herein. For example, in some embodiments, an accommodative surface may be a pliant surface, perhaps pliantly accommodating the control surface (360) by being flexible, supple, or otherwise readily adaptable to the configuration of the control surface (360). Naturally, such a pliant surface may be readily conformed to the control surface (360) in a number of ways. For example, wrapping the pliant surface may result both in a high degree of conformity, perhaps contributing to the ergonomic compatibility clearance of the support structure (320), as well as highly secure engagement of the mounting surface to the manual control surface (320). Examples of utilizing such wrap surfaces may include wrapping with one or more flexible straps, wrapping with a laminar flexible sheet, and the like. Further examples of pliantly accommodative mounting surfaces may be discussed in Example 2. Of course, these examples are merely illustrative, and should not be construed to limit accommodation principles disclosed herein.

Accommodation also may utilize an existing structure or structures of the control surface (360). Handle bars, for example, often may have an open end not otherwise being put to use. In some embodiments, an accommodative surface may be a bar end insert (340), perhaps involving inserting the support structure (320) into the bar end. Examples of bar end inserts (340) may be further discussed in Example 2. Of course, these examples again are merely illustrative, and should not be construed to limit accommodation principles discussed herein.

It may be appreciated that an accommodative surface may be readily amenable to adjustment on a control surface (360), perhaps allowing a greater variety of adjustment options that conventional technologies not employing the accommodative principles discussed herein. Accordingly, the accommodative surface in some embodiments may be an adjustable position surface, perhaps utilizing the accommodation principles discussed herein to adjust a position of the mounting surface in a variety of manners. Such adjustment may include repositioning (such as the changing position of a repositionable surface on a control surface (360), reversing (such as flipping a reversible surface to reverse the ends), rotating (such as changing the angular position of a rotatable surface), and the like. In various embodiments, such adjustments may involve repositioning a wire joined to the hand actuated accessory (326a and 326b), such as to place the wire in a more ergonomic position. In various embodiments, a disengageable wire may enhance the adjustability of the accommodative surface, such as by moving the wire out of the way while the adjustment is made and reconnecting the wire to the adjusted surface. Further examples of the adjustable position surface may be discussed in Example 2. Of course, these examples one more are merely illustrative, and should not be construed to limit the adjusting principles disclosed herein.

The mounting surface in various embodiments may utilize a quick release interface (322) (denoted particularly as "Velcro" in the embodiment of Example 2). The interface may serve to secure and release the mounting surface of the support structure (320) to and from the control surface (360), and may have any form or configuration suitable to accomplish such securing and release consistent with the principles disclosed herein. In some embodiments, for example, the interface may utilize one or more straps.

Quick release may be accomplished so as to permit the support structure (320) to be quickly secured and released from the manual control surface with relative rapidity. In some embodiments, for example, quick secure and release may be implemented in a manner to allow the interface to be quickly secured or released without using tools, such as screwdrivers for removing screws, wrenches for turning bolts, or the like, in as much tool requirements may tend to hinder and slow down the securing and removal of the support structure (320). Exemplary embodiments also may involve quickly securing and releasing without requiring the removal of a handlebar component, such as a handlebar grip, handlebar extension, or the like, in as much as removing such handlebar components again may tend to hinder and slow down the securing and removal of the support structure (320). Naturally, any appropriate device configured in any appropriate manner may be utilized to implement quick secure and release applications of this kind, such as Velcro, ties, clips, magnetic snaps, springs, and the like. These examples are merely illustrative, of course, and should not be construed to limit the quick release principles disclosed herein. In some embodiments, for example, a quick release interface simply may be an interface configured to be quickly secured or released in a relatively short time period as compared to conventional technologies, such as for example perhaps less than 2 minutes, less than 1 minute, or even less than 30 seconds.

In some embodiments, the quick release may facilitate quickly transferring the hand actuated accessory (326a or 326b) from one vehicle to another. This may be useful, for example, for electric throttles connected to a supplemental electric propulsion system, wherein the propulsion system may be moved from one vehicle to another, and the throttle must be correspondingly moved among the vehicles as well. Of course, such usefulness of the quick release interface may extend to any suitable hand actuated accessory, and need not be limited to only throttles. Accordingly, a quick release interface in some embodiments may be an interface configured for quick transfer from a first biomechanically powered vehicle to a second biomechanically powered vehicle. A quick release interface also may incorporate disengaging a disengageable electric connection, for example to permit electrical wiring to be quickly plugged and unplugged from the hand actuated accessory (326a or 326b), again perhaps facilitating transfer of the hand actuated accessory from one vehicle to another.

In certain embodiments, a throttle may be an example of a hand actuated accessory (326a or 326b) that may advantageously utilize the inventive technology. The throttle may be configured as a low profile throttle, such as having a flat surface with at least one button by which the throttle may be actuated. A support structure (320) and mounting surface for the throttle may utilize laminar flexible sheet in which the throttle (326a and 326b) may be held, the laminar flexible sheet perhaps having a width of up to 4 inches and a length of up to 6 inches. A quick release interface (322) may at least one Velcro strap, and the throttle (326a and 326b) further may have a disengageable electric connection connecting the throttle to a supplemental electric propulsion system. The throttle may be secured and released from the control surface of a vehicle by wrapping the laminar flexible sheet at a desired position and wrapping the at least one Velcro strap over one another about the manual control surface. Engaging a plug-in electric connection to the throttle may serve to connect the throttle to a supplemental electric propulsion system. Such a throttle (326a and 326b) may be quickly released from the control surface (360) of, for example, a first bicycle, and then quickly secured to a second bicycle, and finally adjustably positioned on the second bicycle to suit the preference of the rider. Further examples of a removable throttle may be discussed in Example 2. Of course, the examples are merely illustrative, and should not be construed to limit the removable throttle principles disclosed herein.

The following Examples are provided to supplement the disclosure set forth herein. The Examples should not be construed to limit the disclosure set forth herein, such as to particular embodiments set forth in the Examples. Rather, the embodiments set forth in the Examples are to be understood as embodying the broader principles of the inventive technology, and should be understood as disclosure providing support for claims to such broader principles of the inventive technology.

EXAMPLE 1

Summary:

The purpose of this Example 1 may be to improve upon electric bikes and trailers to provide perhaps more torque for acceleration or hill climbing while additionally enabling perhaps higher speed operation. These improvements may not add complex gear changing mechanisms and associated maintenance and decreased reliability.

This Example 1 may provide higher torque for starting or hill climbing and higher speed.

An improvement of the multi-wheeled electric bike, motorcycle, or trailer, may be accomplished with a motor for each wheel. A motor may be connected to one of the wheels and may be configured with low gearing for stronger startup torque. Another motor may be connected to a different wheel and may be configured with higher gearing for higher top speed. A controller may be used to shift power from one wheel to another based on torque, speed, throttle position, and/or other parameters which may indicate a trade between need for acceleration or higher speed.

No mechanical transmission may be required and the shifting may be either automatically controlled or manually commanded by the user. Automatic control may be logically driven by measured parameters such that it may result in more efficiency or acceleration when compared to a decision made by the rider (such as the case when a rider may sometimes forgets to shift).

Motor life may be improved because high level motor currents resulting from full voltage and low RPM may not be sustained as long. Motors may "burn out" when high currents are applied for longer periods; heat may be generated in windings proportional to resistance and current squared. High currents for high torque may increase heat exponentially. Examples where high torque may be required include going uphill or upwind on a high gear motor (full throttle, low speed, long time.) In this Example 1, less heat generation, and greater motor reliability and life may be achieved by employing perhaps multiple motors and perhaps switching between them to maintain better rpm for the torque requirements.

Relevant Drawings:

FIG. 1 is a perspective view of a supplemental electric propulsion trailer having a first electric hub motor and a second electric hub motor in one embodiment.

Figure 2:
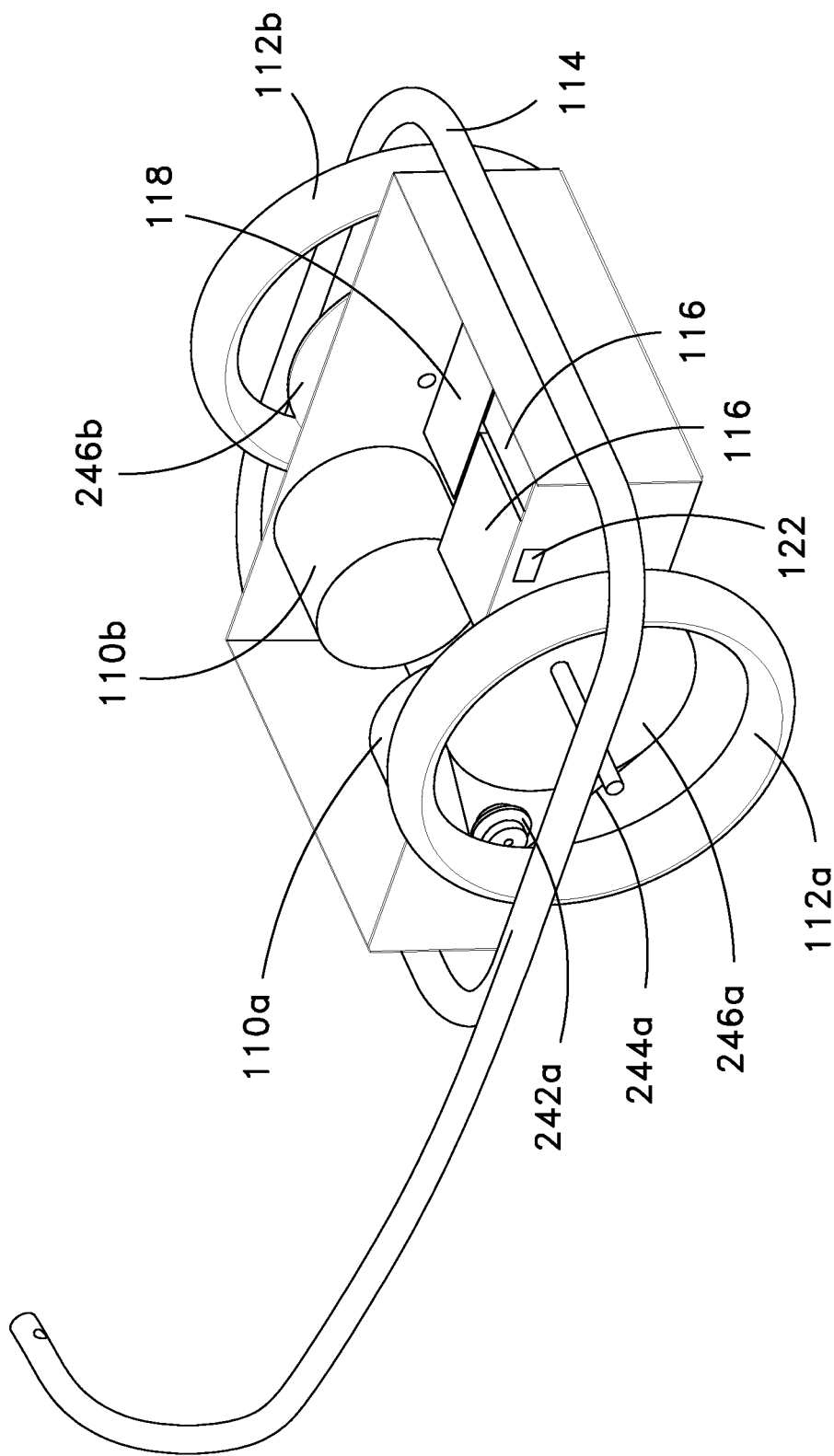
FIG. 2 is a perspective view of a supplemental electric propulsion trailer having a first electric spinning shaft motor and a second electric spinning shaft motor in one embodiment.

FIG. 2 is a perspective view of a supplemental electric propulsion trailer having a first electric spinning shaft motor and a second electric spinning shaft motor in one embodiment.

Figure 3:
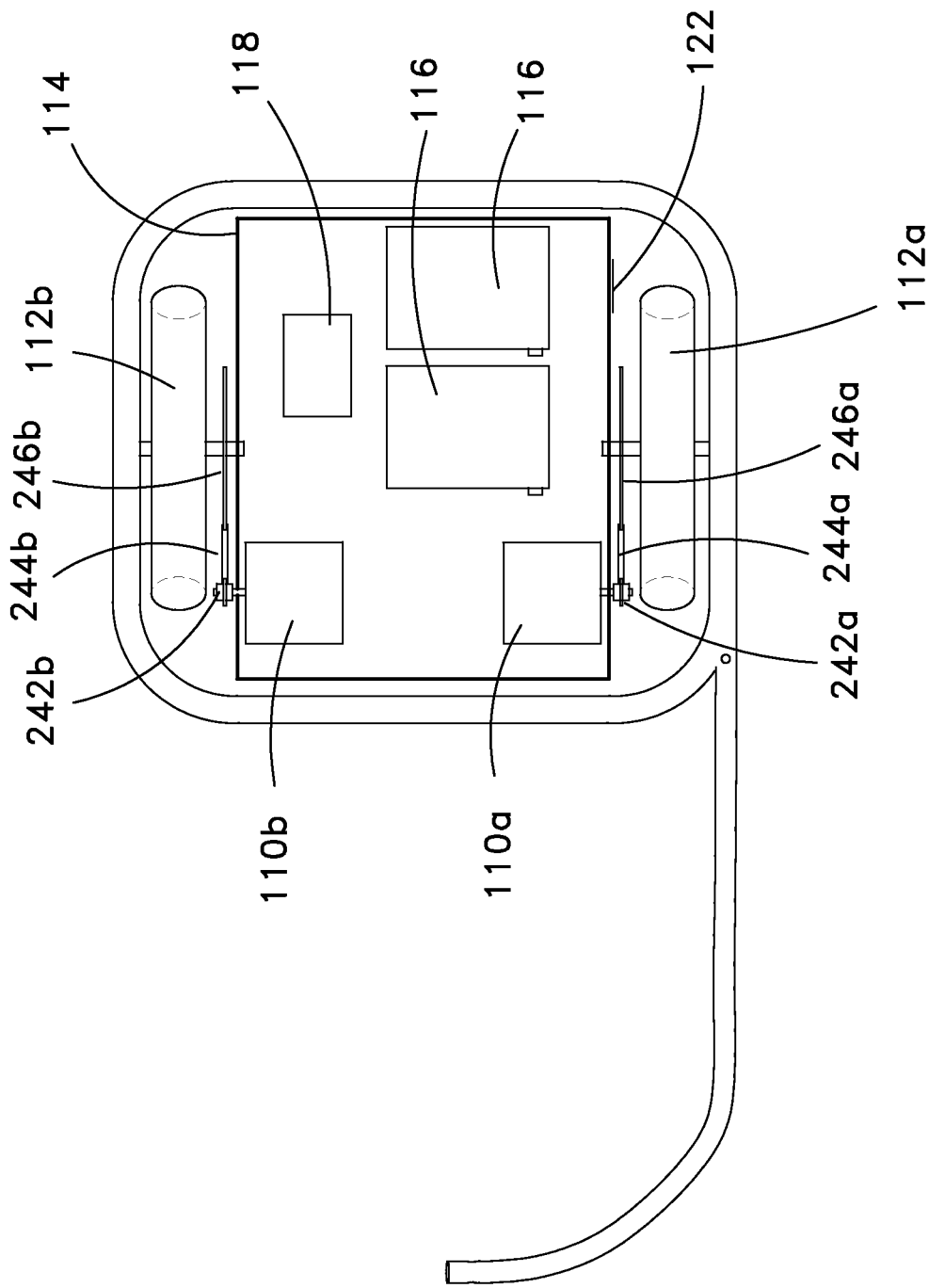
FIG. 3 is a top view of a supplemental electric propulsion trailer in one embodiment.

FIG. 3 is a top view of a supplemental electric propulsion trailer in one embodiment.

Figure 4:
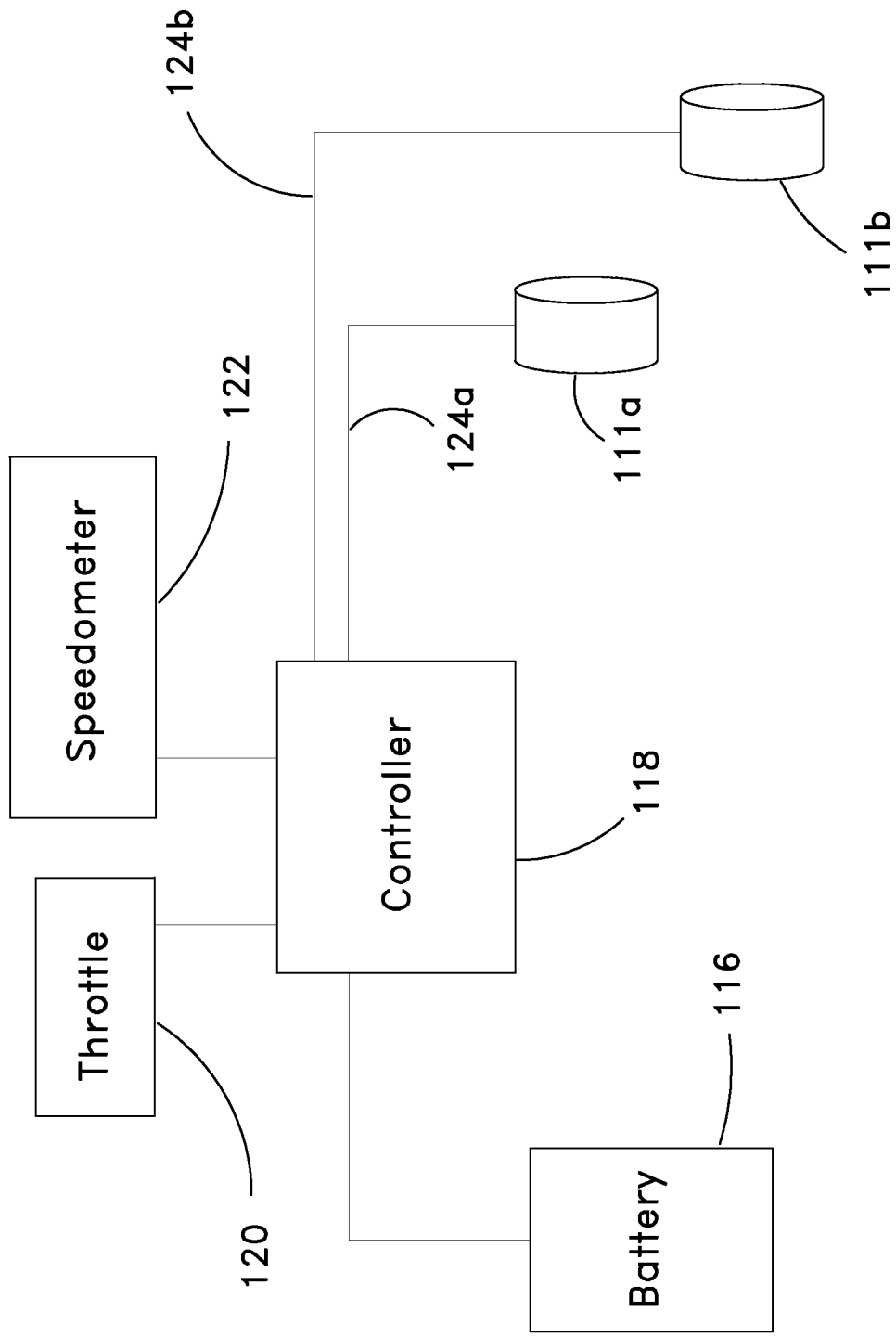
FIG. 4 is a block diagram illustrating electric controller interaction in one embodiment.

FIG. 4 is a block diagram illustrating electric controller interaction in one embodiment.

Figure 5:
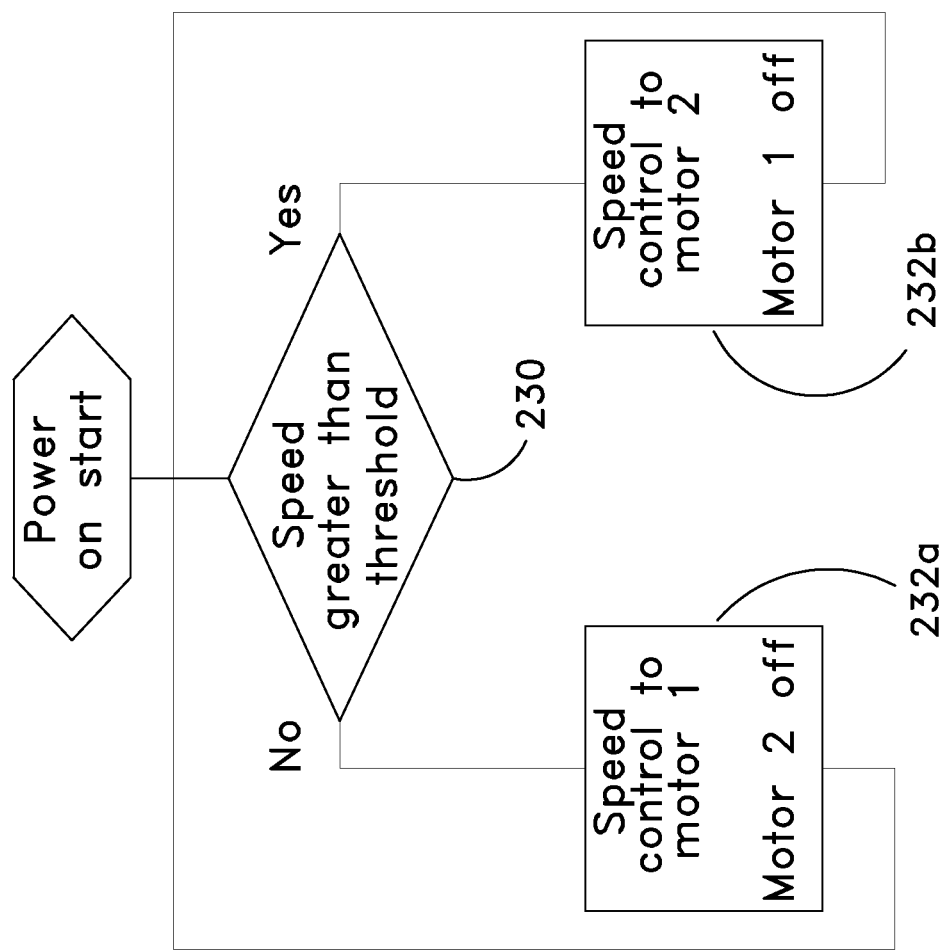
FIG. 5 is a flow diagram illustrating controller logic in one embodiment.

FIG. 5 is a flow diagram illustrating controller logic in one embodiment.

Figure 6:
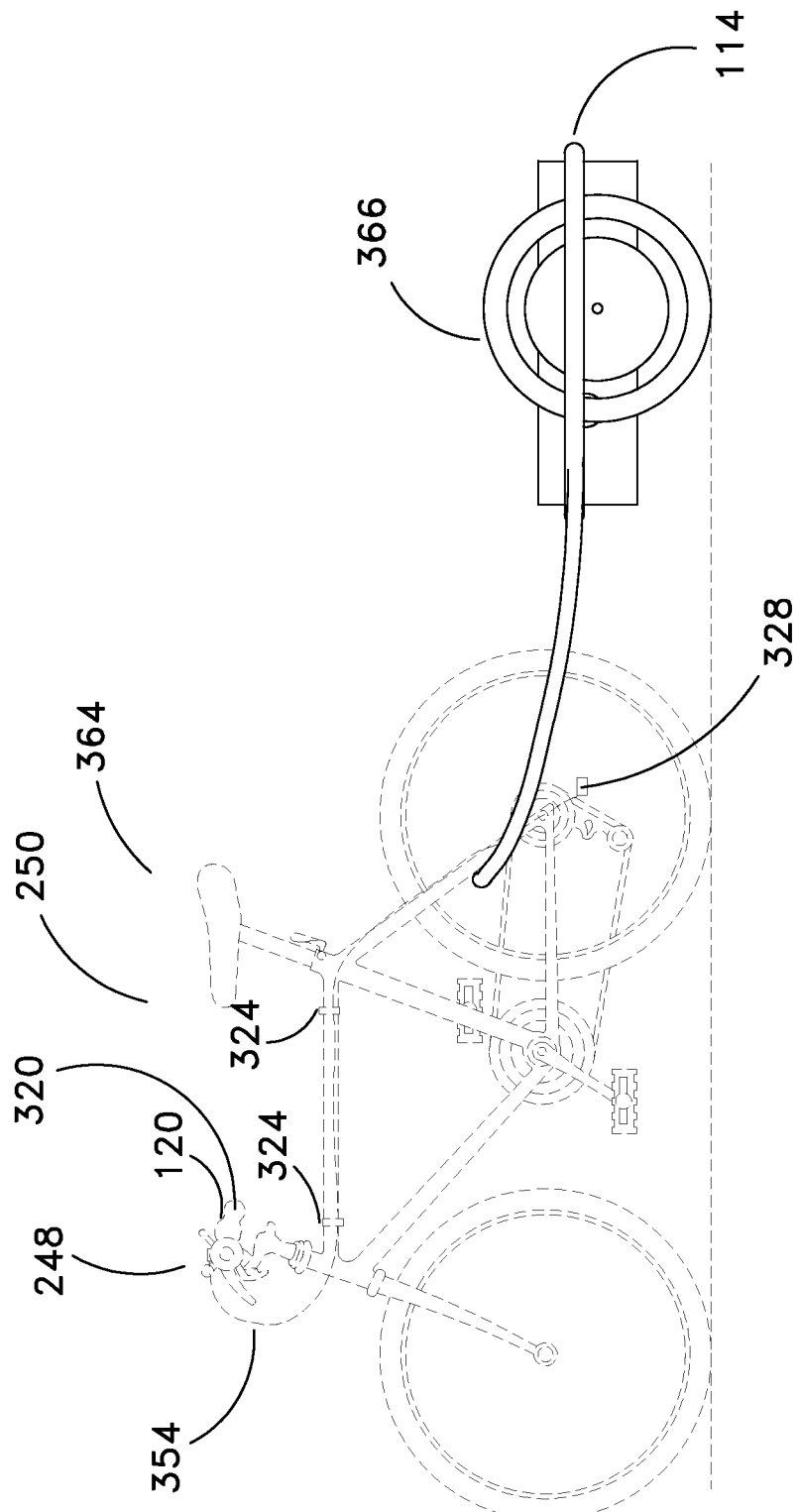
FIG. 6 is an illustration of a bicycle having a supplemental electric propulsion trailer and removable throttle in one embodiment.

FIG. 6 is an illustration of a bicycle having a supplemental electric propulsion trailer and removable throttle in one embodiment.

List Of Reference Numerals:

| | |
|---|---|
| 110a | shaft motor 1 |
| 110b | shaft motor 2 |
| 111a | hub motor 1 |
| 111b | hub motor 2 |
| 112a | wheel 1 |
| 112b | wheel 2 |
| 114 | chassis |
| 116 | battery |
| 118 | controller |
| 120 | throttle with cable |
| 122 | speedometer with cable |
| 124a | motor cable |
| 124b | motor cable |
| 226 | Battery cable |
| 230 | decision block in controller |
| 232a | motor control action block |
| 232b | motor control action block |
| 242a | motor 1 gear |
| 242b | motor 2 gear |
| 244a | chain |
| 244b | chain |
| 246a | wheel 1 gear |
| 246b | wheel 2 gear |
| 248 | Handlebar |
| 250 | Bicycle |

Description:

FIG. 1 shows a perspective view of a basic version of an electric bicycle trailer in this Example 1. Chassis 114 (or frame or structure or base) provides a platform to structurally hold all the parts in such a way to roll efficiently with strength and stability. Motor 1 111a is mounted to the chassis on the left side. In this implementation, motor 1 111a is a hub motor; a standard motor used in electric bicycles which is connected to the wheel rim with spokes. Wheel 1 112a is mounted to the left of motor 1 111a and is powered by motor 1 111a. Motor 2 111b is mounted to the chassis 114 on the right side. Wheel 2 112b is mounted to the right motor 2 111b and is powered by motor 2 111b. Batteries 116 are mounted in the chassis 114. Controller 118 is mounted in the chassis 114. Throttle 120 is mounted to the handlebar 248 of the bicycle 250 as depicted in FIG. 6. Speedometer 122 is mounted on chassis 114 with proximity to wheel 1 112a to sense speed of the trailer based on wheel 1 112a rpm.

FIG. 4 depicts the electrical connections of the electrical-mechanical blocks to create this Example 1. Batteries 116 are connected with a battery cable 226 to the controller 118. The throttle 120 is connected to the controller 118. The speedometer 122 is connected to the controller 118. Motor 111a is connected to the controller 118 with motor cable 124a and motor 111b is connected to the controller 118 with motor cable 124b.

To clarify differences and similarities of hub motors to spinning shaft motors, a hub motor may be fabricated with windings that may be configured for various levels of stall torque and max rpm for a specified voltage. Stall torque may be torque generated when the motor is not spinning at full voltage and current. Hub motors from manufacturers may require such specifications to determine the winding configuration. The hub motor and winding may be equivalent to a standard spinning shaft motor configuration depicted in FIG. 2. A motor 110a with motor gear 242a drives a chain 244a which turns wheel gear 246a fixed to wheel 112a. The gear ratio between the motor gear 242a and wheel gear 246a determines the top speed and starting torque of the trailer for a particular motor 110a and battery voltage. Likewise, motor gear 242b, chain 242b, and wheel gear 246b have a higher gear ratio than 242a and 246a resulting in lower torque and higher speed. Throughout this Example 1 the terms "gearing", "gear ratio", "high gear" and such may be used interchangeably to represent hub motor winding configurations as in FIG. 1 or gear ratios on a chain drive configuration as in FIG. 2 and FIG. 3.

In this Example 1, gearing on the left motor 1 111a and wheel 1 112a are such that top speed is 14 mph and the starting torque accelerates the trailer to 10 mph in 4 seconds. Also in this Example 1, gearing on the right motor 2 111b and wheel 2 112b are such that the top speed is 20 mph and the starting torque capability accelerates the trailer to 10 mph in 8 seconds.

Controller 118 contains a microchip controller capable of sensing inputs and generating signals based on the designed logic. Controller 118 also contains two PWM motor power control circuits which drive motor 1 and motor 2.

A standard power modulation technique may be to use the throttle signal to command a pulse-width-modulation duty cycle to the motor. The signal range of the throttle 120 is 0 volts to 5 volts and correlates to a PWM duty cycle of 0 to 100%. At 0% duty cycle, no voltage or power is delivered to the motor. At 50%, an average of one half of the battery voltage is delivered to the motor. At 100% duty cycle, nearly 100% of the battery voltage is delivered to the motor. Controller 118 shifts the voltage delivery from motor1 111a to the other motor2 111b and then back to motor1 111a depending on the speed.

When the throttle 120 is off, the controller 118 delivers no power to either motor. From a stopped speed, when the throttle signal increases above 0 volts (indicating the rider wants to speed up), controller 118 monitors speedometer 122 and senses a speed of 0 mph. Controller 118 will power motor1 111a and modulate the power based on throttle 120 position manipulated by the rider. Power will continue to be modulated to motor1 111a until the controller 118 senses from speedometer 122 a speed higher than 11 mph. When speed exceeds 11 mph, the controller 118 directs power to motor2 111b and modulates the power based on throttle 120 position, and turns off power to motor1 111a. When speed decreases below 11 mph, controller 118 senses from speedometer 122 a speed lower than 11 mph and directs power to motor 1 111a based on throttle 120 position and turns off power to motor 2 111b.

FIG. 5 depicts the logic within the controller 118. When power is on, decision block 230 monitors speedometer 122 signal and determines if power (or voltage) will be delivered to motor1 111a or motor2 111b. When speed is lower than threshold, power control is passed to block 232a which controls power to motor1 111a based on throttle signal from the rider. When speed is higher than threshold, power control is passed to block 232b which controls power to the motor2 111b based on throttle signal from the rider.

Decision algorithms for block 230 in FIG. 5 can be simple or based on multiple inputs. A manual mode is to respond to a switch the rider toggles (manual shifting), where motor1 111a is powered when the switch selects motor1 and motor2 is powered when the switch selects motor2. The embodiment in this Example 1 shifts power based on speed. A further implementation may be to apply hysteresis into the decision block that shifts power to motor2 when speed increases past 11 mph, and shifts power to motor1 when speed decreases below 10 mph. This hysteresis dead band may prevent fast power switching when speed varies slightly around 11 mph. Block 230 switching decision could be based on speed, throttle setting, motor temperature, fault detection (if one motor is inoperable), motor current, or other operating parameters.

In this Example 1, more than 2 wheels may be utilized, such as a 4-wheeled cart with 2, 3, or 4 motors.

This Example 1 can be accomplished with multiple motors driving a single wheel. Consider the electric trailer in FIG. 2 where the wheel is driven by a chain driven by a motor. The chain that drives the wheel can be driven by two motors. Each motor has a different drive gear (for instance 11 teeth on motor 1 and 15 teeth on motor2); each drive gear has an internal freewheel or one-way-clutch. When power is applied to motor1, motor2 will not be powered and the freewheel decouples motor2 from the chain and wheel. When motor2 is powered, then the freewheel on motor1 decouples it from the chain and wheel. This method can be extended to multiple motors with different gears and freewheels.

Bicycles have two wheels and are natural applications for this Example 1. A hub motor with one gearing on the front wheel and another hub motor of a different gearing on the rear wheel may configure well. The controller design from this Example 1 can be used to drive the two motors in a way to get superior acceleration and good top speed without stressing the high gear motor at starting speeds. Configuring the higher torque motor on the correct wheel may improve handling at low speeds.

Controller 118 in this Example 1 can be implemented in a number of ways. One PWM instead of two can be used with separate power FETs for each motor controlled by decision block 230. Instead of PWM style power control, variable reluctance or phase controller or other various power control schemes can be used to power the motors.

There may be advantages to be gained in this Example 1 by powering two motors at once. The decision algorithm in FIG. 5 block 230 can modulate power to multiple motors for spurts of acceleration, better hill climbing, or diagnostics.

Transmissions can be used in conjunction with this Example 1.

This Example 1 has described one type of speedometer. Any equivalent speed sensing techniques would provide a useful signal for controller 118.

Degenerative braking may be utilized in this Example 1. Here a more gradual effect is achieved by coupling the appropriate motor(s) to generate energy in slowing, stopping or even pedaling.

Conventional wisdom may have dictated that two motors are not worth the extra cost. Redundancy may have been the first objective for two motors when one motor can provide enough power. This Example 1 demonstrates increased utility for at least the reason of employing different gearing to create a new result and additional benefits of getting past the barriers of the standard electric motor torque/speed trade off. In the case of an electric bike or trailer, costs may be increased only 15% (approximately) for incorporating two motors as indicated herein. This Example 1 may increase performance, reduce power heat to the motor system and improve reliability. This Example 1 may power the bike with better torque and higher speed. Reducing high motor current times may reduce stress and improve longevity of motors.

EXAMPLE 2

Summary:

The purpose of this Example 2 may be to provide a throttle: 1) for an electric cycle or cycle with attached power trailer which a rider can actuate to command power from the motor; 2) that can be installed on a wide variety cycles quickly and simply (wide variety includes mountain bike style, cruiser style, recumbent style, and racing style wrap handlebars); 3) that can be moved or transferred from cycle to cycle quickly and simply; 4) that is mechanically and ergonomically compatible with various handbrakes, gear shifters, hand grips, and handle bar extensions or bar ends; and 5) a throttle that it is simple to use, adjustable for many size hands and fingers, ergonomically comfortable, and reliable.

This Example 2 may relate to a throttle that installs with no tools or minimal tools. One embodiment simply wraps around the grip and is held in place with Velcro or a clip. Another embodiment simply inserts into the hollow end of the handle bar. Both embodiments can be adjusted rotationally for various size hands and fingers to improve comfort and accessibility.

The throttle of this Example 2 generates compatible control signals for most electric motor controllers and can be designed for more types. Rider throttle manipulation creates continuously increasing signal or stepwise increasing signal depending on the embodiment. Each embodiment has levels of reliability, simplicity, ergonomics, weatherproofing, and cost that can be considered for various target market needs and requirements.

This throttle of this Example 2 allows for simple installation on a wider variety of cycles which expands the possible installed base for marketing electric upgrades or trailers. The invention installs over the existing grip or bare handle bar, or in the end of the handle bar which is free from brakes, shifters, and extenders. The embodiments avoid the space required for braking and shifting.

Additionally, this Example 2 allows users to simply transfer from one cycle to another. For bicycle conversion kits, installation time is minimal. For electric trailers, the trailer and throttle can be moved to another bike in perhaps less than 1 minute to share the device amongst family or friends. This is a customer value and competitive advantage of the product.

As used in this Example 2: cycles encompass bicycles, recumbent bicycles, tricycles, scooters or other wheeled vehicles that can benefit from motorized propulsion; motor units can be electric, gas, fuel cell, or other types; aftermarket products like electric bike conversion kits may be encompassed by this Example 2; trailers or propulsion units that mount to the bike front or rear may be encompassed by this Example 2.

Relevant Drawings:

FIG. 6 illustrates a throttle installed on a bike with electric trailer.

FIG. 7 is a top view of fabric base throttle embodiment (a)

FIG. 8 is a side view of fabric base throttle embodiment (a)

Figure 9:
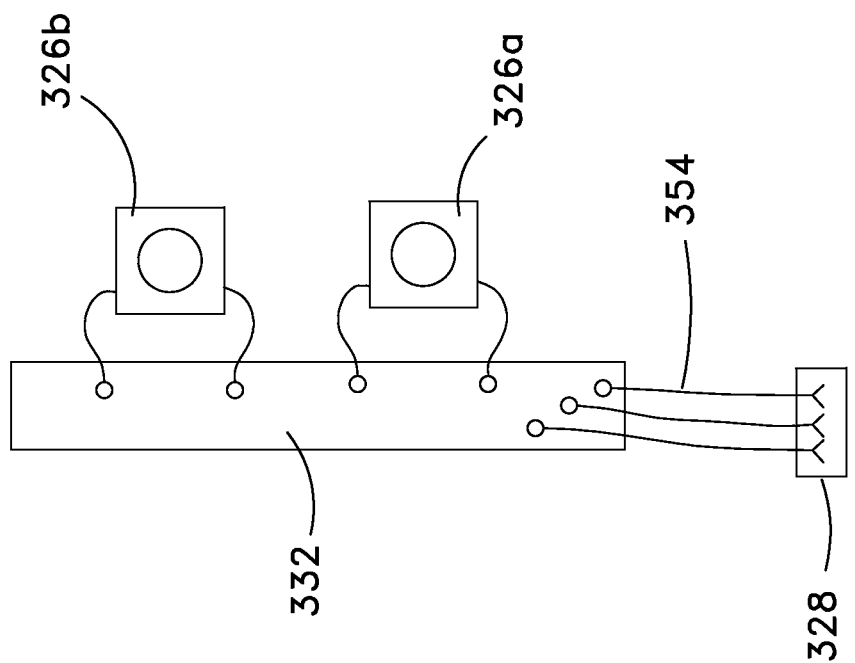
FIG. 9 is a block diagram of electrical components for a removable throttle in one embodiment.

FIG. 9 is a block diagram of electrical components

Figure 10:
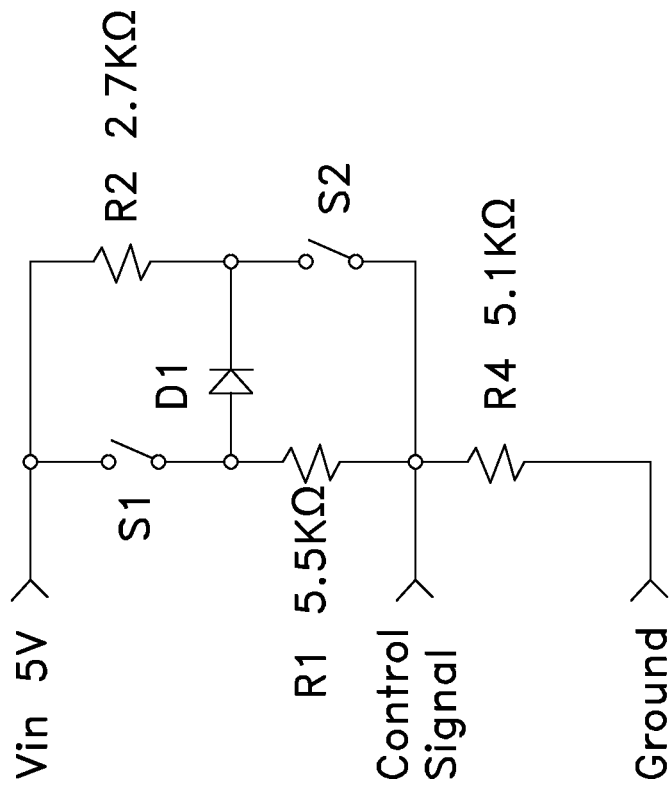
FIG. 10 is an electrical schematic of a removable throttle in one embodiment.
Figure 13:
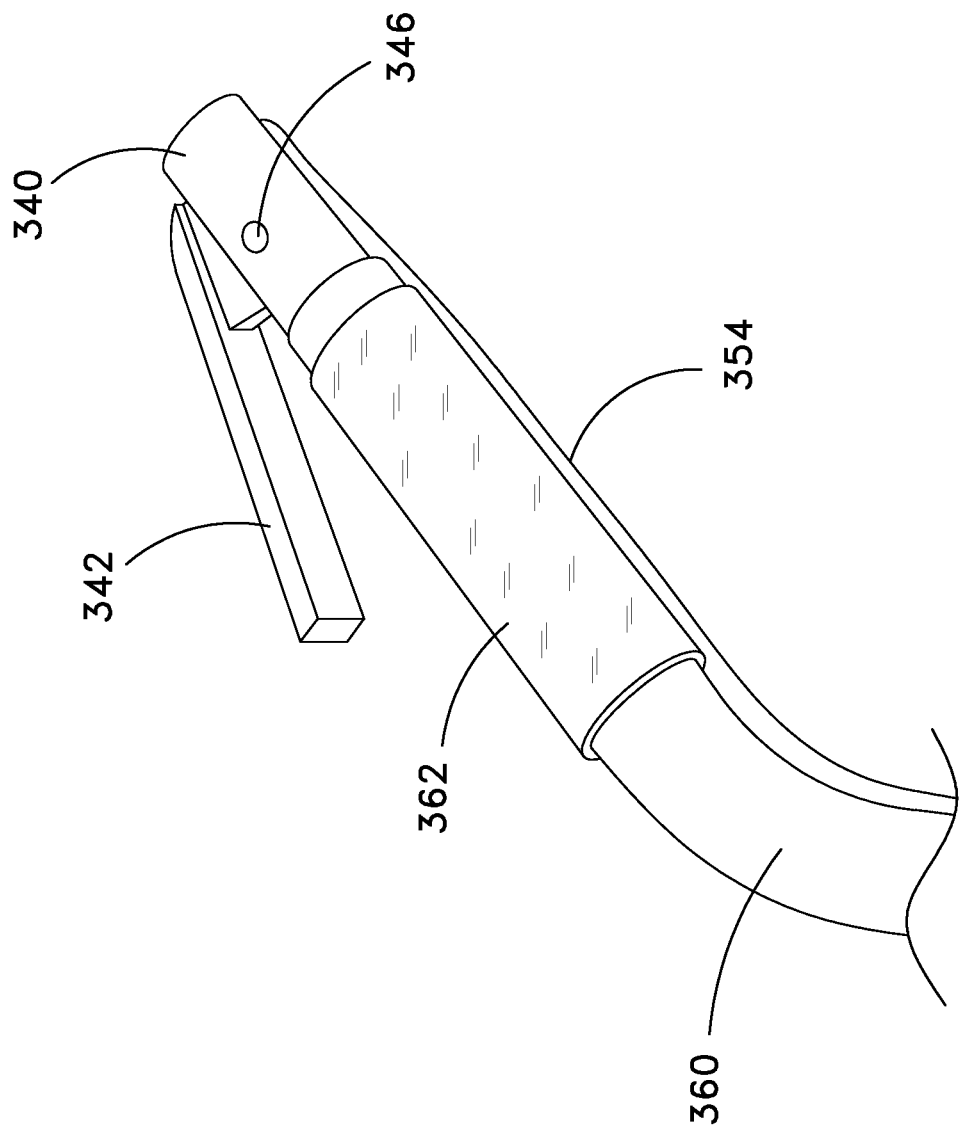
FIG. 13 is a perspective view of a bar end insert removable throttle in one embodiment.
Figure 14:
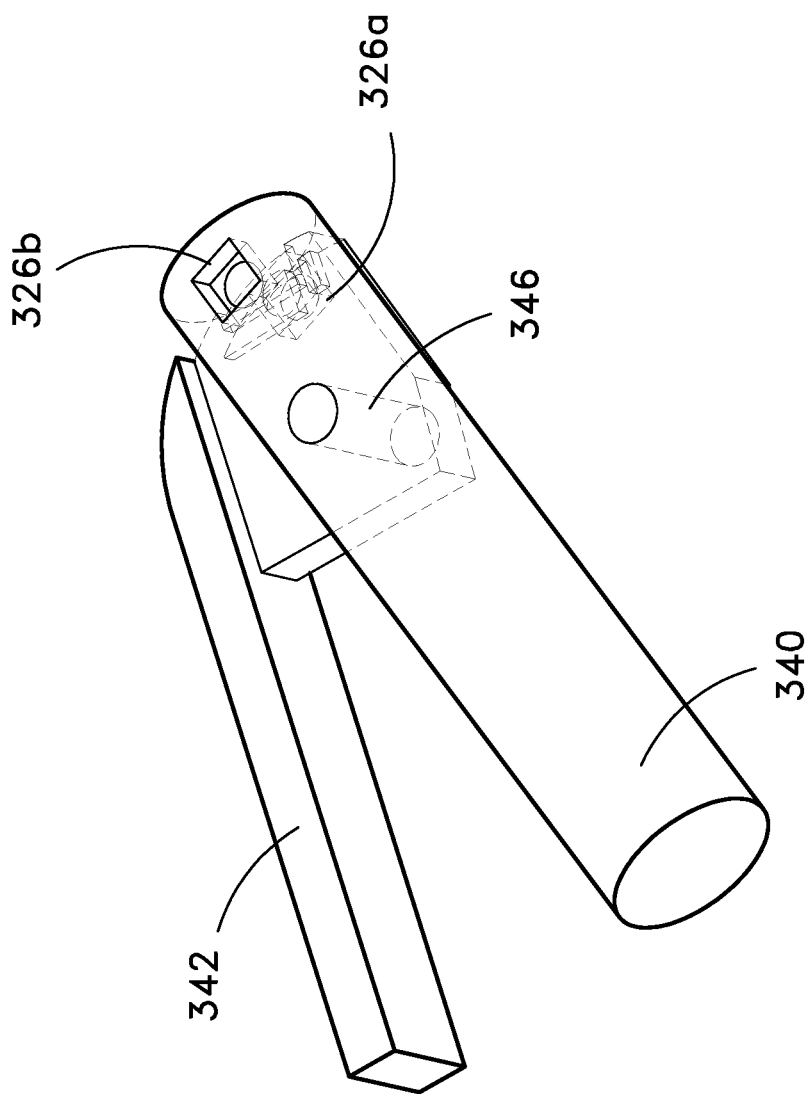
FIG. 14 is an interior perspective view of a bar end insert removable throttle in one embodiment.

FIG. 10 schematically depicts the electrical connections between buttons and components to generate control signals for a controller FIG. 11 is a perspective of embodiment (a) installed on a handle bar over a grip FIG. 12 is a perspective of embodiment (a) reversed on a handle bar over a grip FIG. 13 is a perspective view of embodiment (b) installed on a handle bar FIG. 14 is a perspective of throttle embodiment (b) which inserts into the handle bar end and uses a rotating lever FIG. 15 is a top view of throttle embodiment (b)

FIG. 16 is a side view of throttle embodiment (b)

List Of Reference Numerals:

| | |
|---|---|
| 320 | fabric base |
| 322 | Velcro |
| 324 | Velcro straps |
| 326a | button A |
| 326b | button B |
| 328 | electrical connector |
| 332 | circuit board |
| 340 | bar insert |
| 342 | throttle lever |
| 346 | pivot pin |
| 348 | torsion spring |
| 354 | electric wire |
| 360 | handle bar |
| 362 | handle bar grip |
| 364 | Bicycle |
| 366 | Electric trailer |

Detailed Description—Embodiment (a):

Shown in FIG. 7 and FIG. 8, the fabric base 320 is 4" wide and 6" long and encases button A 326a and button B 326b to hold them securely in place for the rider. The fabric has a hole for each button to hold the button in place and allow the rider to manipulate the button. Fabric base 320 is folded and sewn around the buttons 326a and 326b and circuit board 332 to securely encase the buttons.

Velcro 322 is double sided Velcro with hook on one side and latch on the other. Two strips of Velcro 322 are sewn near each end of the fabric base 320 in an orientation that allows the Velcro to be wrapped around the handle bar and fasten to itself.

Buttons 326a and 326b are electrically connected in the circuit described in FIG. 10. The simple schematic depicts how to build a circuit which can substitute for a potentiometer that provides a control signal to the controller. A potentiometer may act as a voltage divider to generate voltage signal between the supply voltage and ground; supply voltage and ground are normally provided by the controller. Conventional technologies may use a voltage between 0 to 5 volts to command the controller. The circuit in this Example 2 uses the same supply voltage and ground as the potentiometer and the signal voltage is 0 volts when no buttons are depressed, 2.4 volts when button A 326a is depressed, 3.3 volts when button B 326b is depressed, and 4.7 volts when both button A 326a and button B 326b are depressed. While the continuous adjustment of a potentiometer is not present in this embodiment, the four distinct control levels provide a simple, intuitive, and functional range of speeds: off, slow, medium, and fast.

FIG. 9 shows the small circuit board 332 which holds and connects electrical components. The board 332 is near the buttons 326 and held in place by the fabric base 320. The wire 354 is long enough to be held in place along the handle bar 360 and frame of the bike 364 back to the controller connector (on an electric bike) or back to the trailer connector. A connector 328 is provided to enable quick disconnect and connect of the throttle. To achieve portability, Velcro straps 324 or a substitute like tie wraps are used to hold the wire in place along the bike 364 frame as shown in FIG. 6.

FIG. 11 shows embodiment (a) installed over a grip 362 on a handle bar 360. Note how the fabric base 320 wraps around the grip (or bare bar if there is no grip) for a comfortable fit. The Velcro 322 wraps around the bar 360 or grip 362 to provide a non-slip fastening of the throttle.

Operation of this implementation is described in three topics: the throttle is installed over the handlebar grip, on the bar extension, or any tubular part of the bike. The rider controls the power delivered to the cycle by actuating the throttle. And finally, the throttle is uninstalled for use on another cycle.

Installing the throttle is started by wrapping fabric 320 around the handle bar grip 362, then wrapping each Velcro strap 322 around the handle bar and over itself to fasten the throttle securely to the handle bar 360. Adjusting for comfort or ergonomic alignment is accomplished by loosening the Velcro straps 322, moving the throttle along the handle bar 360 cylindrical axis (left and right) or rotationally around the handle bar 360 cylindrical axis (twisting) and then rewrapping the Velcro straps 322 to re-fasten the throttle. Then the wire 354 that connects the throttle to the controller is held in place with Velcro straps 324 along the cycle 364 frame. Finally the throttle connector 328 is electrically connected to the controller or controller connector.

Controlling the power or throttle is accomplished when the rider manipulates button A 326a and/or button B 326b which creates an electrical signal on wires 354. Wires 354 transmit the signal to the controller which powers the motor which propels the bicycle 364 and rider. In FIG. 6, a trailer 366 senses the wired signal to determine how much power to deliver to the trailer 366 and bicycle 364. Pressing no buttons commands no power, pressing button A 326a commands low power, pressing button B 326b commands medium power, and pressing both button A 326a and button B 326b simultaneously commands high power.

| Buttons pressed | None | A | B | A & B |
|---|---|---|---|---|
| Command to power unit → | off | slow | med | high |

Uninstalling the throttle is accomplished by simply unwrapping the Velcro straps 322 and removing the throttle fabric base 320 from the handlebar 360 and releasing the Velcro strips 324 fastening the wire 354 to the bike 364 frame.
Detailed Description—Embodiment (b):

Shown in FIG. 14, FIG. 15, and FIG. 16, bar insert 340 serves as a foundation for the throttle parts and coupling to the handle bar. Bar insert 340 has a slot and opening for the lever 342 which is held in place with pivot pin 346. Lever 342 is free to rotate around pivot pin 346 between the handle bar 360 and the maximum rotation constrained by interference between insert bar 340 and lever 342. Torsion spring 348 provides return force to lever 342 such that when the rider releases pressure from the lever 342, it springs outward to diminish the control signal. When released by the rider, the lever 342 springs all the way out to create an "off" signal. Buttons A and B 326 are mounted to the bar insert 340 to hold them in securely in place and alignment to lever 342. Buttons 326 are on top and bottom of lever 342. Lever 342 has raised cams that activate or depress the buttons 326 in sequence as the lever 342 is rotated around pivot pin 346 towards the handle bar 360. The motion range of the lever can be designed to any throw; in this embodiment it is about 25 degrees of rotation. Between 0 and 6 degrees, no buttons are depressed and the control signal is 0 volts. Between 6 and 12 degrees (approximate degree measurements), button A 326a is depressed and button B 326b is not depressed and the control signal is 2.4 volts. Between 12 and 19 degrees (approximate degree measurements), button A 326a is not depressed and button B 326b is depressed and the control signal is 3.3 volts. Between 19 and 25 degrees, both buttons A and B 326 are depressed by the cam on lever 342 and the control signal is 4.7 volts.

The electrical components in FIG. 9 are affixed to a small circuit board 332 held in place by the bar insert 340 and next to buttons 326. The wire 354 is long enough to be held in place along the frame of the bike back to the controller (on an electric bike) or back to the trailer. A connector 328 is provided to enable quick disconnect and connect of the throttle. To achieve portability, Velcro ties or tie wraps are used to hold the wire 354 in place along the bike frame. Control signal voltages are determined by the schematic in FIG. 10.

FIG. 13 shows embodiment (b) installed in the end of the handle bar 360. Note how the bar insert can be adjusted rotationally along the insert bar axis to be comfortable for different hand sizes and angle of rider grip. The insert bar 340 has interference bumps which are 1 mm tall to be a very light press fit into the bar end so that it stays in place and is allowed to be adjusted. For larger handle bar 360 openings, shims or adhesive tape can be used for a secure fit.

FIG. 14 shows only the bar 340, lever 342, pin 346 and buttons 326 for clarity. FIG. 16 does not include the wire 354 or connector 328 for clarity.

Operation of this implementation is described in three areas: the throttle is installed in the end of the handlebar 360 or on in the end of a handle bar extension. The rider controls the power delivered to the cycle by actuating the throttle. And finally, the throttle is uninstalled for use on another cycle.

Installing the throttle is started by pressing bar insert 340 into the open end of the tubular handle bar 362 and twisting it to align the lever 342 to be comfortable with the pinky and ring finger of the rider hand. Then the wire 354 that connects the throttle to the controller is held in place with Velcro straps 324 along the cycle 364 frame. Finally the throttle connector 328 is electrically connected to the controller. Handle bars 360 may have dirt plugs in the end; for installation, the plug is removed to allow the bar insert to be pressed into place.

Controlling the power is accomplished when the rider manipulates the lever 342. The torsion spring 348 biases the lever 342 out to the off position. In the off position, the control signal is 0 volts as described previously. When the rider squeezes the lever 342 toward the handle bar 360, the lever 342 rotates and depresses buttons 326 which generate control signals off, slow, medium, and fast. As the rider releases pressure on the lever 342, the torsion spring 348 presses the lever 342 out, and as the lever passes through the four rotation zones, signals are generated as described above. Wires 354 transmit the signal to the controller which powers the motor and propels the bicycle 364 and rider. In FIG. 6, a trailer senses the wired signal to determine how much power to deliver to the trailer 366 and cycle 364.

| Lever rotation (degrees) → | 0-6 | 6-12 | 12-19 | 19-25 |
|---|---|---|---|---|
| Buttons pressed → | None | A | B | A & B |
| Command to power unit → | off | slow | med | fast |

Uninstalling the throttle is accomplished by simply pulling bar insert 340 and removing from the handlebar 360. Unplug the connector 328 and release the Velcro strips 324 fastening the wire 354 to the bike 364 frame.

Button actuators in this Example 2 can range from 1 to many buttons. A single button can be an on/off signal and the signal can be shaped to slowly ramp up and quickly turn off. Multiple buttons or an array of switches can be configured to create many signal levels. And various combinations of buttons actuated can be programmed for various control signals.

The fabric base in this Example 2 can be made of plastic or rubber membranes or other material. The buttons can be entirely enclosed in the base to create a more weather proof throttle.

Velcro strips are used for fastening in this Example 2. Many alternative fastening devices can be used such as one sided Velcro, tie wraps, adhesive tapes, spring clips, spring clamps, or coil springs.

The press fit bar insert in this Example 2 can be accomplished in multiple ways. Functionally, it may be intended to easily insert and allow for rotation adjustment and still be secure. Alternatives may include an interference fit with pliable material, a cam that is actuated by twisting, a cam that is actuated like a quick release on bike wheel axles, or an expanding joint actuated from the exposed end.

The lever in embodiment (b) of this Example 2 is described as depressing buttons with a cam. Alternatives may include: parts that interrupt a light path (optical sensor); hall effect sensors; magnetic reed switches; or variable potentiometers. The rotary motion can actuate rotary devices like a potentiometer or rotation encoder.

The lever in embodiment (b) of this Example 2 can be adjustable to adapt to thicker or thinner grips or varying handle bar geometries.

Velcro, adhesive, or spring clips can be rubberized in this Example 2 for controlled friction to hold the throttle in place.

The circuit in this Example 2 can be mounted in the handle, embedded along the wire, or integrated in the controller. The circuit can be mounted on a circuit board, flexible circuit board, or no circuit board where only the raw signal is delivered to the controller or if electrical components are mounted to the buttons, connector, or inline with the wires.

The circuit in this Example 2 can deliver continuous or quantum levels of signal with standard electronics. Simply deliver raw button signals and have the smart controller interpret it, use RC circuit to create a smoothly transitioning signal from one button voltage level to the next, or a microprocessor to shape the signal for efficiency or performance. Some controllers require a full range of 0-5 volts, while others only use 1-4 volts, and others demand a different signal range altogether. The throttle design of this Example 2 can be tailored or programmed for any signal range or type. "Controller" is used in this Example 2 as a generic notion that translates throttle input to vehicle power.

The throttle in this Example 2 can house a light, noise generator, or other feedback to display throttle information like throttle level, speed, power, and such. Such indicators can be inline with the wire too.

The throttle in this Example 2 can be configured at purchase or by the user to have button combinations or signal levels that the user prefers. Speed settings can be programmed for each button or combination of buttons. The buttons or signal level can be used to signal other functions like a button sequence to unlock the controller (as a form of theft prevention.)

The throttle wire in this Example 2 can be replaced with wireless transmission. Employ a battery to power the throttle, embed a wireless transmission circuit like Bluetooth or RF transponders in combination with a matched receiver wired to the controller to provide the throttle signal to the controller.

The outcome of this Example 2 can be created with a combination of above embodiments: insert plug (embodiment b) with bar that holds buttons (like embodiment a).

The Example 2 may be understood to utilize an actuator, a fastening method, and a signal generation and transmission method.

The actuator in this Example 2 functions to convert the rider manipulation into a signal for the power unit. In the described implementation, the actuator consists of button A and button B. In place of buttons, the actuator can be implemented with a slider action or rotary action (twist). These actions can be combined with electrical contact(s), optical interrupter(s), hall effect sensor(s), or variable resistor(s).

The fastening method in this Example 2 holds the actuator and signal transmission method to the cycle. The result is to hold the actuator stable during use and allow for adjustment and simple installation/removal. In the above description, fabric 320 and Velcro 322 are used to hold the throttle to the handlebar grip. A spring type clamp can be used, adhesives with reusable qualities can be used in conjunction with sheet format fabric or rubber or other materials.

The signal transmission method in this Example 2 transmits the actuator signal to the power unit. In this Example 2, wires transmit signal from the buttons to the power unit. In various embodiments, fewer wires can be configured to transmit voltage signal, resistance levels, digital signal or analog signals. Equivalent function is designed with wireless transmission using light (like infrared) or radio waves (like RF). The actuator and transmission can be simply constructed with switches and wires, or can integrate electronic parts like resistors and diodes, or microprocessors and antennas to create the transmission method of choice.

This Example 2 may allow for better ergonomic fit and adaptability to congested handlebars. Electric upgrade kits and electric trailers can be fit to many more bicycles than before without use of tools or the need to change the familiar position of shifters, grips, and handle bar extenders.

EXAMPLE 3

Summary:

The purpose of this Example 3 may be to provide accurate and effective diagnosis of failed components in electric vehicles, thus perhaps greatly simplifying troubleshooting, decreasing downtime, and lowering costs. A processor may monitor voltages and currents much like skilled technician would and algorithmically determine the most likely failed component. The techniques of this Example 3 may diagnose most if not every component of the system.

Devices are placed amongst the components to measure voltage, current, power, speed, and/or temperature (this is a partial list of viable parameters) of key parts or assemblies. A processor unit monitors the parameters, compares measurements and calculates resultants to predetermined operating limits, and records events for later analysis and evaluation.

Monitoring and evaluation initiate with initial power-up, continue through operation, and when the unit is powered off (battery monitoring may be valuable). A diagnostic mode can be selected to enable more accurate diagnosis in concert with user interaction. Algorithms are designed to not just test components in a static state, but to check during functioning with power (both during operation or diagnostic modes).

Recorded information history can be displayed directly or transferred to another device (such as laptop computer) for further analysis. This information can also be used to access databases of reference information (like blogs, knowledge bases, manufacturing or repair databases) to enhance diagnosis and repair efforts.

The engineered combination of sensors and diagnostic logic in this Example 3 may provide the technician with effective diagnostic information about electronic parts with no required electronics training. No external voltmeters or ammeters are required, even though they are basic diagnostic tools for these types of systems used by electrical engineers or persons in related disciplines.

This Example 3 provides data from advanced tests and test conditions that are beyond the normal scope of even a well outfitted technician. This Example 3 monitors power losses during high acceleration (high current) and can diagnose (for example) poorly seated connectors based on the power loss (voltage drop).

High accuracy diagnostics may help the technician avoid time spent swapping parts that are in good working condition. One example from actual observation was a fault that exhibited sporadic power loss during acceleration; when the rider wiggled the throttle, power sporadically resumed. First diagnosis was a faulty throttle mechanism or faulty electronics. However, the real cause was a corroded fuse connector. Without the techniques of this Example 3, a technician might swap throttles and find that the sporadic fault still existed. Then the technician then might infer that the controller was the fault and spend the time and money to replace this expensive component for naught, and the problem would still persist. Even a skilled technician might measure voltage before and after all components while powered up on the bench and not running a significant current; the corroded connector would likely not be found with a voltmeter at low current. The corroded fuse connector might never be found and the entire product might be sent back under warranty. But with the techniques of this Example 3, the fuse perhaps could be identified as the culprit based on power loss calculations at significant current, and perhaps replaced in minutes, perhaps yielding a successful repair in minimal time and minimal expense.

The recording function of this Example 3 for electric bikes and trailers supplies a history of errors that occur during operation and storage. Even if the error is intermittent and would otherwise result in a "NTF" (no trouble found), the recorded history can identify likely faulty parts. A power switch with a loose contact that infrequently rattles open may illustrate the utility of this Example 3. When a bump in the road may cause the contact to disconnect momentarily, the diagnostic may sense the voltage drop on one side of the switch in concert with a current decrease from the battery and the motor, and when the switch rattles back into normal contact the diagnostic system may sense and record the switch voltage resuming to normal. In many cases, when the product may be taken to a shop for diagnosis, the switch may be connecting well and there may be no trouble found (NTF). This may leave the technician with no information and no rational repair may be able to be made. The diagnostic system of this Example 3 records the condition and when inquired, can direct the technician to test the switch and replace it. The result may be a faster diagnosis and repair of an elusive NTF fault.

This Example 3 also may disclose an interactive diagnostic mode. Experience in diagnostic sleuthing may tend to show that some errors may not be able to be accurately diagnosed with only the sensors provided. A battery wire with chafed insulation that infrequently rubs against the metal bike may illustrate the utility of this Example 3. When a bump in the road may cause the wire to briefly touch the metal and short, the diagnostic may sense the voltage drop at the battery in concert with a current increase from the battery and no current increase through the motor ground. The diagnostic may record the condition and may direct the technician to complete an interactive diagnostic exercise to find the "shorting" fault. (Note these conditions may identify a short rather than an intermittent "open"; in the case of an open, the interactive test would be different). Without the interactive test, the algorithm may be able only narrow the fault down to a few assemblies; with the interactive diagnostic, the fault may be pinpointed. The result may be a faster diagnosis and repair of an elusive fault.

A throttle with a malfunctioning actuator may prove another illustration of the benefits of this Example 3. If the fault causes a throttle to create a signal range of 0% to 60% of the full range, the rider may sense that the product is underperforming; the unassisted diagnosis could be poor batteries, worn motor, bad controller, or a bad throttle. Unassisted diagnostics might indicate that all is well within the system. An interactive procedure could disable power to the motor for safety, and then instruct (can be audio) the user to actuate the throttle from zero power to full power then back to zero power again. The controller could monitor the signal and simply determine it never rose above 60%; the diagnostic information could alert the user that the throttle is the fault, and not the other components. The fault could be recorded in memory.

A challenging scenario that may be solved by this Example 3 may be the ability to diagnose a faulty component that results from the demise of another. This Example 3 may have the ability to monitor and report on multiple components. An illustration of this may be the product in which a motor is burned up (shorted windings due to excessive heat). The normal repair might be to replace the motor and consider it fixed. The root cause in this example would be a malfunctioning controller that provides long durations of excessive current under high load (for example going upwind). The controller may perform perfectly in normal use and would likely escape unnoticed as the real problem. If the controller is not replaced, the new motor again would receive too much power under load and fail prematurely. This Example 3 records high current events (during normal use) such that the technician may be able to identify the controller as needing replacement too. This may prevent a series of burned out motors and resulting customer dissatisfaction.

In this Example 3, the user may be able to quickly see that all is working well or which component is not functioning to specification. Corrective action may be taken perhaps immediately with limited inconvenience.

Motor end-of-life predictions can be deduced from total mileage, total current, RMS current changes, and/or other runtime information in this Example 3.

This Example 3 may prevent motor burn up, such as by limiting duration of motor current, power time, and/or temperature.

In a multiple motor vehicle, if one motor has failed, this Example 3 may provide for instructing the controller to only use the good motors and continue to function under limited performance.

This Example 3 may provide for setting speed and/or acceleration limits (such as set by parents for child safety, or for those wanting to reduce speed for themselves).

Theft deterrence may be provided for in this Example 3 deployed with an electronic lock secured by a keypad combination or similar security device.

This Example 3 may provide for the ability to provide a rider with performance feedback. Speedometers on bikes with distance and speed metrics may be sold widely because many riders enjoy the information. An electric bike utilized with this Example 3 may have substantial data that may be interesting to a rider. An example list of controller information that could be displayed are: watts, total watt-hrs used, estimated rider energy, power remaining, miles per charge, and history. Other functions can include a rider speed tracker for monitoring child riding safety.

Relevant Drawings:
FIG. 17: Block diagram of controller architecture
FIG. 18: Flow chart of system controller
FIG. 19: Block diagram of electric scooter or electric trailer current art
FIG. 20: Block diagram of controller architecture with parallel battery configuration List Of Reference Numerals:

| 420a) 420b) | Batteries: |
|---|---|
| 422) | Current limiting device: i.e. fuse |
| 424) | Current interrupter: |
| 426) | Power switch: |
| 428) | Drive motor: |
| 430) | Motor power controller (PWM, or brushless) |
| 431) | Motor power controller - existing art |
| 434) | Brake sensor |
| 436) | battery voltage indicator - existing art |
| 438) | Throttle |
| 440) | Diagnostic System controller: |
| 441) | System controller - existing art |
| 442) | Clock: (Part of system controller but outside processor) |
| 444) | Battery charger: |
| 446) | Battery controller: (alternative embodiment) |

Sensors

| 450a, 450b) | Current sensor |
|---|---|
| 452) | Motion sensor |
| 454) | Temperature sensor |

Human inputs

| 460) | Security key lock: This is a device to prevent unauthorized use of the vehicle. Some options are a mechanical key lock, or |
|---|---|

-continued

| | wireless authentication device (i.e. key fob). |
|---|---|
| 462) | Keypad |

Displays

| 470) | Operational display: (can be separate on handle bar and or on trailer, OR can be combined with other functional display like speedometer, ... |
|---|---|
| 472) | Diagnostic Display |

I/O

| 476) | I/O port |
|---|---|

Parameter signals

| 482a) | Battery a voltage |
|---|---|
| 482b) | Battery b voltage |
| 482c) | Battery c voltage |
| 482d) | Battery d voltage |
| 486) | Fuse voltage |
| 488) | switch voltage |
| 490) | Current interrupt voltage |
| 492) | Motor L voltage: |
| 496) | Battery controller voltage: |
| 4100) | Battery charger sense: |

Detailed Description:

FIG. 17 is a block diagram of one implementation of this Example 3. While diagnostics are defined separately from the electric vehicle ("EV") operational system controller, the electronic controller functions and EV operational controller functions may be fulfilled in the same processor hardware. This embodiment combines the two because it may decrease hardware cost and communication complexity between two electronic blocks.

Components Used in Example 3.
420a), 420b) Batteries.
422) Current limiting device. Examples include a fuse or circuit breaker.
426) Main power switch.
424) Current interrupter. Example include FET, SCR, contactor, relay, or other means.
428) Drive motor. Example include brushless or brush motor or any other electric motor.
430) Motor power controller. Examples include PWM, or electronic commutation.
434) Brake sensor.
438) Throttle. Can be actuated by user hand OR generated from pedal sensors, remote unit, foot pedal, hitch sensor, etc.
440) Diagnostic system controller. Functional combination of operation controller and diagnostic controller. The system controller receives inputs from many sources and drives outputs to several destinations. It makes decisions about power management, user interface, diagnostics, logging of events, reports system status and overall vehicle health. One implementation is a micro controller, but other embodiments are FPGA, discrete hardware or multiple micro controller systems. The system controller may have a battery backed memory, non volatile memory or equivalent for storage of diagnostic information, performance history, operational adaptive coefficients, calibration constants and other semi-permanent information.
442) Clock. Part of system controller but can be implemented outside processor.
444) Battery charger. Provides charging power for batteries and may provide signal to the controller. The charger could also sense signal information from the controller or batteries to aid efficiency or identify battery type.

446) Battery controller. Controls power from parallel battery configuration, and controls charging current/voltage into each parallel battery.

450a), 450b) Current sensor.

452) Motion sensor. Capable of implementation in various ways. Examples include a hall-effect sensor on the wheel, axle, motor, or chain, or an optical sensor or rotation sensor on one of many moving parts. In this embodiment, a hall sensor is placed near the wheel gear with a magnet on the gear.

454) Temperature sensor. Temperature information for batteries, controller, motor and other components are beneficial. Many technologies for sensing temperature are available. In this embodiment, a thermistor is mounted to sense temperature of the motor.

482a) Battery a voltage.

482b) Battery b voltage.

486) Fuse voltage.

488) Main switch voltage.

490) Current interrupter voltage.

492) Motor L voltage.

496) Battery Controller voltage.

4100) Battery charger sensor. Signal to controller signifying the charger is engaged to batteries.

460) Security key lock: This is a device to prevent unauthorized use of the vehicle. Options include a mechanical key lock, a keypad for typing in a password or pass number, or wireless authentication device (i.e. key fob).

462) Keypad. Keys (or buttons) can be multifunctional, single function, or menu driven. In this embodiment, five labeled keys are used.

470) Operational display. Can be separate on handle bar and or on trailer, or can be combined with other functional display like speedometer. Audible output can be implemented as well.

472) Diagnostic display. Can be placed anywhere on the product or be a remote display. Audible output can be implemented as well.

476) I/O port. Input/output connector for data transfer and control.

Overview.

The embodiment of this Example 3 builds around the basic EV structure by adding sensors and a processor with inputs and outputs.

In overview, EV components generally may be placed to configure a product with utility for the rider. Batteries 420 supply power, the controller 440 manages power to the motor 428 in response to throttle and other inputs (like brake switch and battery voltage), finally the motor(s) use the electrical power to generate motive power. The charger 444 delivers power to the battery, when connected.

Sensors and signals from key components are available to the processor. Voltages from the batteries, fuse, switch, motor, motor power controller, throttle, and charger are tapped and wired to the controller. Current sensors and signals along with a motion sensor and a temperature sensor and signals are connected to the processor.

Display(s) are connected to the diagnostic system controller. The security device and input keypad are connected to the diagnostic system controller. The I/O port is the standard USB connector and protocol which allows direct communication to a PC, memory device, or other devices.

The diagnostic system controller has memory, processor capability, analog to digital converters (ADC) which translate analog voltage signals to digital codes for the processor, a clock, auxiliary battery for when the main batteries are disconnected, and input/output connections for input/output devices and the I/O port.

In the embodiment of this Example 3, the diagnostic system controller is integrated with the motor power controller. The processor unit within the system controller monitors the safety and inputs for the motor power controller, and there is auxiliary hardware for driving motor winding current.

Display(s) and input(s) can be one integrated unit or multiple separate items (such as an ignition key, FOB, remote, keypad on the trailer or bike, display on the handlebar and/or on trailer, etc.)

The order of components 420 through 444 around the main power path can be varied for different operational, assembly, or service attributes. For example, swapping 426 and 424 will provide the same basic functionality. The diagnostic system of this Example 3 can be adapted to these alternate configurations.

Not all of the components and signals shown in FIG. 1 are needed for a useful vehicle or diagnostic ability. Subsets and other combinations of listed components are encompassed by this Example 3. For instance, the intermediate battery voltage 482a in FIG. 1 is convenient and gives better diagnostic coverage, but is not required.

Various quantities of batteries 420 in series and parallel configuration can be accommodated by this diagnostic system. FIG. 20 is a block diagram of the controller architecture with an example parallel battery configuration. Batteries 420c and 420d are in parallel to 420a and 420b. With more than two batteries, it may be beneficial but not required to monitor the intermediate voltages, creating similar intermediate voltage sense points 482a, 482b, 482c . . . as needed. An auxiliary or separate battery may be used to power the controller or memory.

Not all diagnostic points are needed to perform useful diagnostics. Removing a diagnostic point and inferring its operation from other data points is encompassed by this Example 3.

Current sense modules 450a and 450b can be somewhat redundant and will indicate nearly the same current in a functioning circuit. Excluding either current sense module still may provide functional diagnostics. Adding more may enable higher accuracy in finding failed components.

These figures show a single drive motor 428 and a single motor power controller 430. For the purposes of this Example 3, the operation and diagnostics of multiple motors and/or motor controllers is contemplated.

Figure 18:
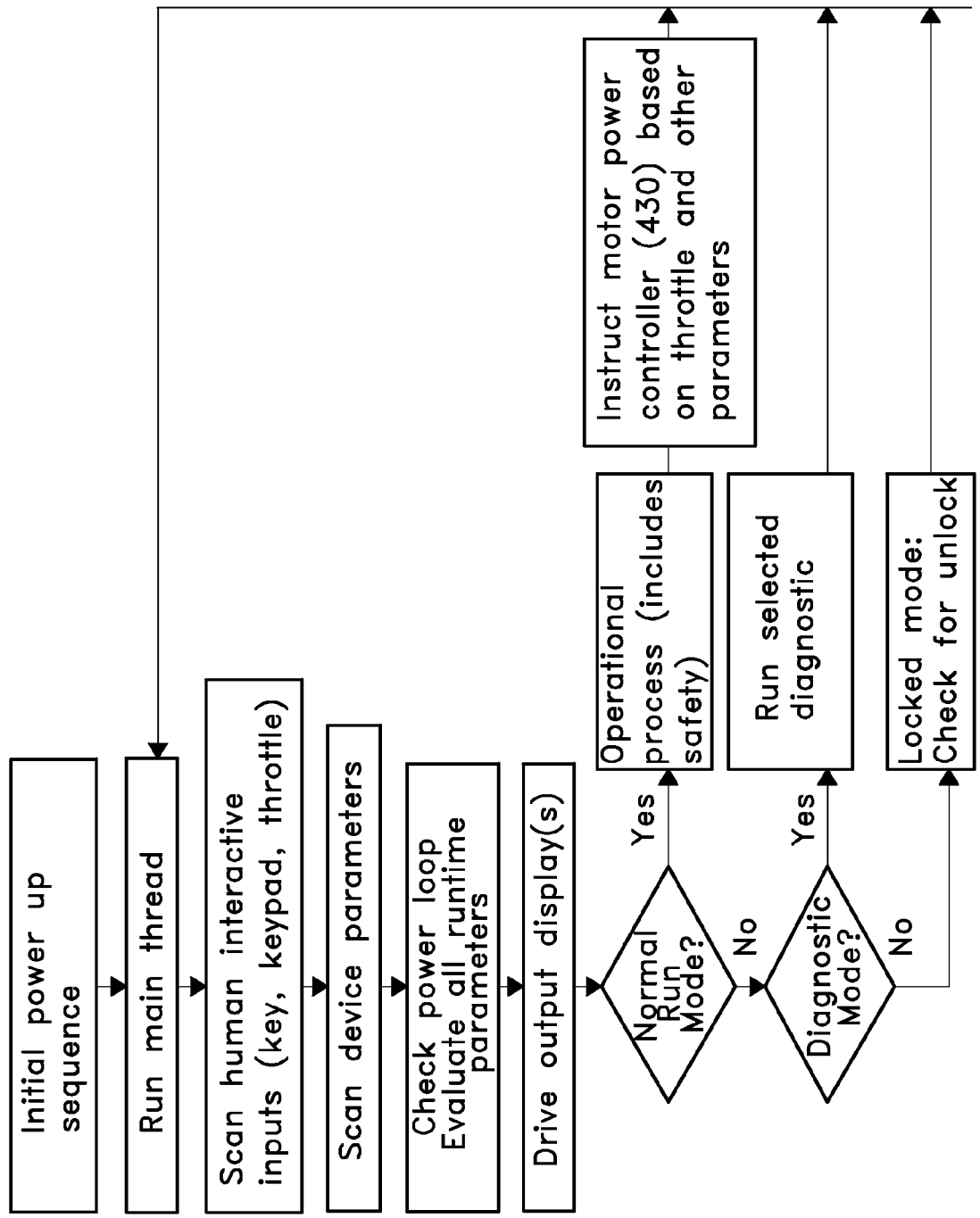
FIG. 18 is a flow diagram of a transdisciplinary diagnostic processor logic in one embodiment.
Figure 19:
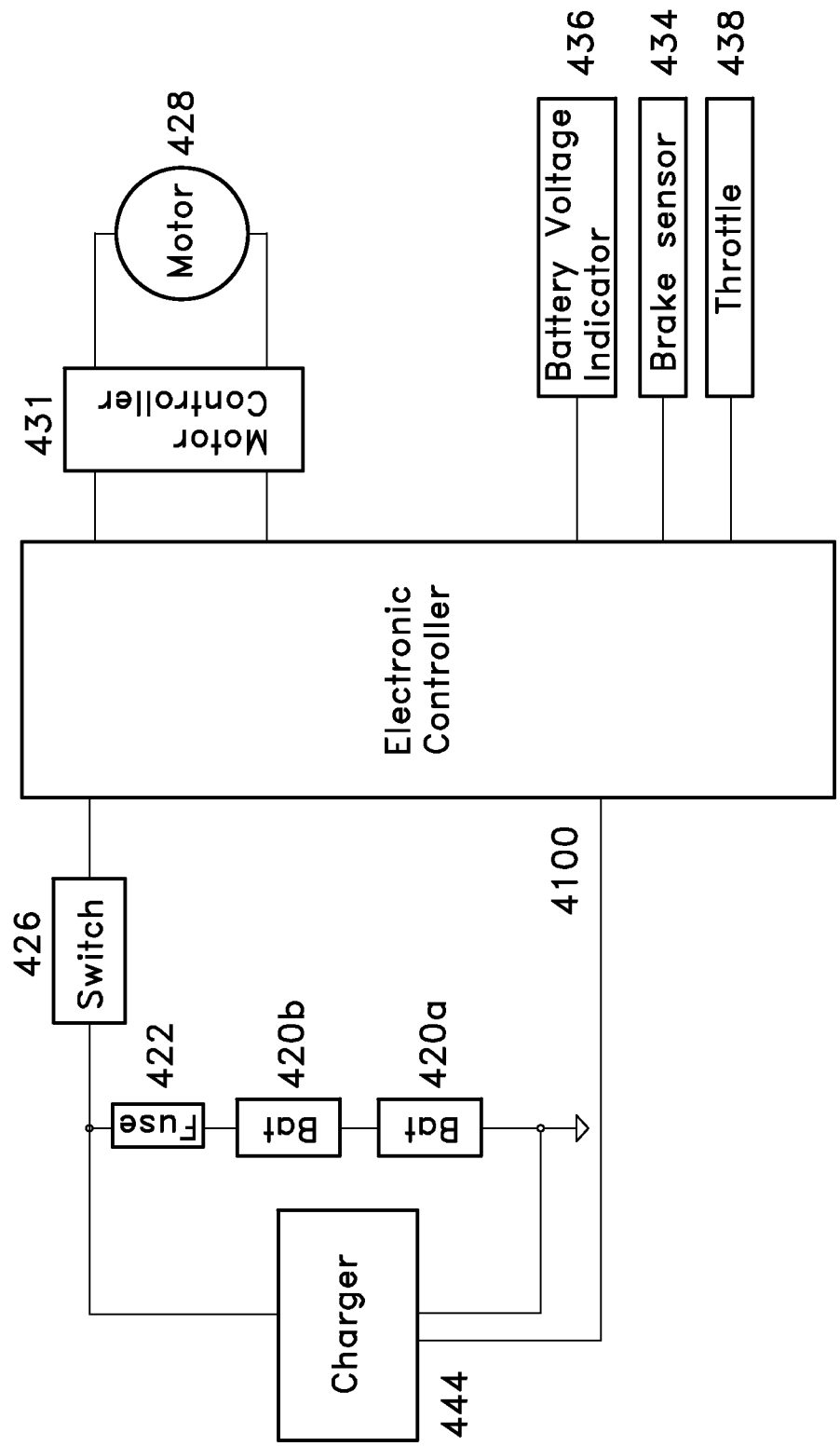
FIG. 19 is a block diagram of a supplemental electrical propulsion system in one embodiment.

One Logic Flow Diagram for FIG. 18.

FIG. 18 depicts one logic flow diagram for controller 440 functions.

Initialization. Initialization occurs at power up including: checking functional connections (such as clock operation); turning off power to motors 428; reading power down condition from memory; checking I/O port 476 for interactive device; setting locked mode, and driving displays 470 and 472 with initial indications.

The main thread operates foundational processes like memory management of recorded information, and multi-threaded operations if required (like timing functions or motion detector interrupt management).

All human inputs (such as keypad 462 entries, throttle signal 438, and security key 460) are scanned to determine mode (locked, diagnostic, or normal run) and commands. The I/O port 476 falls under the category of human inputs in this embodiment; mode selection and simulated inputs can be generated through the I/O port 476.

All device parameters are scanned (such as voltages from batteries and motor leads, current measurements, speedometer, thermometers, brake sensor).

Check Power Loop. "Check power loop" is a diagnostic evaluation consisting of a voltage, current, and power accounting. Check voltages around the loop to determine if all are within operating parameters. Check readings from current sensors; if throttle signal is off, all current readings should be less than minimal threshold to be nominal. Otherwise if the throttle signal is demanding power, all current sensors should report readings within common thresholds or a short is probable. If current is above power measurement level, power consumption around the power loop can be effectively evaluated; calculate power (current×voltage drop) consumption around the loop and evaluate relative to limits. Each signal and calculation has a defined range of operational acceptability, if any signal or calculation is out of limit a logical flag is set for diagnostic logic analysis.

Evaluate Runtime Parameters. "Evaluate all runtime parameters" (beyond power loop) such as speed relative to selected safety levels and/or motor current relative to thermal limits and throttle signal. A diagnostic logic algorithm is developed to identify the most likely suspect components. Faults and out-of-normal operating events are recorded to persistent memory.

Drive Output Displays. In this embodiment, there is one diagnostic display 472 and one operational display 470. Operational status (for the rider's quick perusal) is speed and battery voltage level. Diagnostic status of each assembly is displayed repeatedly in normal run mode.

At the decision block, it is determined by the human interactive inputs which mode to operate in.

In normal run mode, the processes for running the vehicle safely and efficiently are executed. Multiple settings can be selected by the user through the keypad or security key such as: full power, power conservation, or speed limit set; these are useful, for example, to keep kids at a safer speed or to limit acceleration to extend battery life. The operational process block applies the setting parameters as a control over the operational algorithms. Inputs instruct the motor power controller 430 to mete power to the drive motor 428. When logical flags (which indicate severe faults) are set during the evaluation process, the controller will be commanded to shut off power to the motor 428 and record in memory the fault information.

In the diagnostic mode, diagnostic sequences are selected by human interactive input and algorithmically driven. In the instance of checking the throttle, the diagnostic controller commands the motor power controller to turn off power to the motor for safety. The diagnostic display turns on the array of lights in proportion to the throttle signal level. For the next 20 seconds, as the person actuates the throttle from zero power to full power then back to zero power, the person can witness the throttle signal and the system controller records in system memory the range achieved.

In the diagnostic mode, "I/O diagnostic" is a class of selected diagnostics in which diagnostic records can be transferred to an external device, diagnostic procedures can be controlled by an external device, firmware can be transferred to the system controller, or other I/O functions can be invoked. Diagnostic algorithms in the product or external devices can be updated with new code installations. Evolution of algorithms can be based on new information from bike shop experiences, data from failed units, user information, and other sources.

In the locked mode the processor checks for "unlock" (either the key lock signal or correct keypad combination) and displays status reflecting locked mode. The locked mode may be invoked when the main switch 426 is off. A periodic process may be a very low power process thread which monitors battery power once every hour with intention of audibly alerting (one of the displays may have a beeper or speaker) the user that recharge is beneficial. This process may also invoke a desulfation cycle for a lead acid battery or some other battery maintenance scheme.

Implementation Configuration and Diagnostics.

Audible display (speaker or beeper) can be helpful to alert the user that battery parameters are out of norm and need service.

Data recording of fault data includes parameters that help pinpoint the fault: time, all measured parameters, human input status, monitored sensors like speed and temperature. If active data logging is enacted, the state of operation just before the fault can be logged. If the fault condition changes, the new state and time is recorded to help identify intermittent faults or conditions.

The diagnostic port can be used to transfer data to an external device. For instance, if the external device is a PC, the historical data and status information can be better displayed with PC graphics and tables; and factory data from outside can be compared to the specific product data to better identify the problem. The data port also accepts data from external devices which can invoke new diagnostic algorithms or sequences to better troubleshoot the product or monitor information in different ways.

Realizing that processors can be programmed incorrectly or can fail in a way to become inoperative, hardware within the system controller can be used to monitor and override processor controls for safety; for instance a circuit may be implemented to cut motor power if the brake sensor signals braking action.

Diagnostic Algorithms.

Power Measurement. While the unit is operating, the "check power loop" algorithm outlined above identifies more than the normal diagnostic setup. In the case when the unit needs to be evaluated and does not or has not run, a short pulse test can be initiated. The energy needed to move an EV can be calculated based on weight and motor torque. In essence, current can be delivered to the motor for a short time and not deliver enough energy to noticeably effect the EV (based on safety or human sensitivity). A diagnostic is designed around providing a pulse of current to the motor and performing "check power loop" while the current is flowing. All components in the power loop can be evaluated under load which can uncover faults undetected in low current state. This algorithm can be safely invoked at power up, or when a user requests, or an automated process directs.

Battery 20 Health Check Algorithms. During the charging phase, observing the charging current 450*a* and the charging voltages 482*a* and 482*b*, the total charge accumulated can be observed. Also, the time it takes to achieve full charge is an indicator of battery health. As batteries approach end of life, the time to reach full charge decreases.

Under operation, the motor 428 load will cause the battery voltages to droop. The individual battery voltages can be measured by the difference of 482*b* to 482*a* or from 42*a* to ground. This system design can measure the Effective Series Resistance (ESR) of each battery. ESR=(Vno_load−Vunder_load)/load current. ESR 420*a*=(482*a* (when 450*a*=0)−482*a* (when 450*a* is greater than 10 amp))/(450*a*). As lead acid batteries approach end of life, the ESR will increase; therefore battery health can be evaluated and reported.

In a series battery configuration of FIG. 17, the batteries should "track" each other. They should have similar charge time, ESR, and voltage characteristics. How well the batteries track each other is another indicator of battery health; if one battery shows voltage lower than the other by a threshold, then that battery can be identified as unhealthy. This can avoid the reaction to replace both batteries when performance sags. The Diagnostic Display 472 will indicate expected battery life based on an algorithm using charge time, discharge time, and ESR. If a battery behaves differently than its peer(s) it will be indicated as unhealthy, or if significantly different than its peer(s), the battery will be indicated as failed.

In the parallel battery configuration of FIG. 20, the battery controller 446 will monitor the charge and health of the associated parallel battery pack, and report its findings to the system controller 440. Battery controller voltage 496 in conjunction with battery voltage 482*b* and 482*d* allow the diagnostic controller 440 to monitor battery controller 446 health.

Fuse 422 Blown or Circuit Breaker Tripped. Observe the voltage on both sides of the fuse or circuit breaker, 482*b* and 486. If the voltages are significantly different (parameter can be set at 2 volts), indicate that the fuse is blown on the diagnostic display 472. If the voltages are slightly different (between 0.1 v and 2 v), then calculate resistance=V/I=(486−482*b*)/450*a*; if resistance is above threshold (set parameter at 0.1 ohms), then indicate the fuse is weak, nearing failure, or should be unplugged then plugged in to refresh contact.

Switch 426 Test. The user enables and disables the vehicle by closing and opening the switch 426. By observing points 486 and 488, the system controller can detect a change of state on switch 426 and will indicate this in the diagnostic display 472. If the user sees a change or state different than the human view, a malfunction is identified.

If voltages 486 and 488 are slightly different (between 0.1 v and 2 v), then calculate resistance=V/I=(488−486)/450*a*; if resistance is above threshold (set parameter at 0.1 ohms), then indicate the switch is weak, nearing failure, or should be unplugged then plugged in to refresh contact.

Motor 428 Health. As the drive motor 428 approaches end of life or needing brush replacement, drive current at 450*b* and 450*a* may become erratic. Also, the voltage 490 or 492 may become irregular too. By watching the Root Mean Square (RMS) values at 492, 450*a* and/or 450*b*, the health of the drive motor may be observed. The diagnostic display 472 will indicate expected motor and brush life based on increases in these RMS values.

A motor 428 failure occurs when the user "opens" the throttle 438, the system controller 440 commands the motor power controller 430 to deliver power, there is a supply voltage at 490, there is a lesser voltage at 492 and there is no current sensed at 450*a* and/or 450*b*. Under this condition, the diagnostic display 472 will indicate a motor failure (this represents a motor open circuit or disconnected connector—different states would indicate a shorted motor winding, as outlined in the next paragraph).

Under bench testing, the system controller 440 can command the motor controller 430 to provide power for a short pulse (for example, 50 milliseconds, 100 milliseconds, or the like). During this time, the controller would expect to see voltage activity at node 492 and current sensed at 450*a* and/or 450*b*. Depending on inductance and resistance of the motor, current and voltage parameters can be determined for identifying normal or abnormal operation (for example, inductance and resistance determines how current should increase over the short pulse time).

The embodiment of this Example 3 is illustrated with a DC brush motor. This system is easily adapted to brushless motors, hub motors of both varieties, and other motor styles. Brushless motors can be monitored with voltage and/or current measurements on each winding and hall sensor monitoring.

Motor Power Controller 30 Test. A motor power controller 430 failure is sensed when the user "opens" the throttle 438 and the system controller 440 commands the motor power controller 430 to power the motor 428, but the voltage at 492 does not change significantly.

Under active testing (an explicit or bench test), the system controller 440 commands the motor power controller 430 to turn on for a short pulse (for example 50 milliseconds, 100 milliseconds, or the like). During this time, the controller would expect to see the voltage at 492 to drop and resulting current change from 450*b*. In conjunction with measurements at 490 and 450*a*, a fault can be localized to the motor power controller 430 or other components around the power loop.

Common failures in the power controller 430 are shorted power FETs. This system diagnoses this failure by measuring 492 lower than threshold.

Diagnostic System Controller 440 Self Test. The system controller 440 can perform a self test. For example, a dedicated processor could run a ROM checksum, RAM test and processor instruction test.

Diagnostic Display 72 Test. Depending on implementation, there are methods to test diagnostic display. For example, if the display is implemented with indicator lamps or LEDs, change of state on switch 426 can initiate sequential flashing of all the indicators for a few seconds. The user or technician can monitor the light sequence to identify if all are working or not. If the display is implemented with an alphanumeric display, change of state on switch 426 can initiate a sequence of LED messages that exercises all elements. The sound signal can also be tested in the same initiated sequence, which may be an interactive test.

Current Sensor 50 Test. Depending upon the current sense technology, it may be possible to detect that the current sensor has malfunctioned. For example, if the current sense by measuring the voltage across a small resistor or shunt, an unreasonably high voltage would indicate a failure that would be reported on the diagnostic display 472.

Another algorithm check may be if the motor is functioning (motion sensor indications in concert with correct voltage parameters) and one sensor is reporting correct current, then the other sensor is likely at fault.

Interactive User Diagnostic Algorithms. Rotate the wheel(s) a few revolutions to make sure that the wheel really can turn and the problem isn't seized bearings. A test mode would request the wheel to be spun while the system controller 440 reports wheel rotations from motion sensor 452 on the diagnostic display 472; the user verifies that when the wheel rotates, the display correctly reflects it.

An interactive user diagnostic algorithm aids a technician in finding a loose or intermittent connection. In the high vibration environment of a vehicle, connectors can become intermittent, or wires may become frayed and broken. The "wiggle test" will prompt the user to wiggle various wires and connectors while the system monitors all signals for a change in status. For instance, if signal 488 drops from 24 volts to below 20 volts and signal 486 is steady 24 volts while the user is wiggling wires, the controller 440 will determine that switch 426 and its wires are suspect and display results to the user.

Interactive throttle test algorithm disables power to the motor for safety, and then instructs (audio can be utilized) the person to actuate the throttle from zero power to full power then back to zero power again. The controller would monitor the signal and evaluate the range sensed and display and record results.

These tests (and others) could be prompted by the user via keypad 462, system controller 440, a separate diagnostics device connected to the I/O port 476, or a diagnostics guide. History and Logging. It is often convenient to know how the vehicle was operating at the time of failure compared to prior (or entire lifetime) history. The non-volatile memory may be used to store a list of operational parameters such as max power, Amp-Hours to discharge, Amp-Hours to charge, and/or RMS noise of motor (both current and voltage), voltage measurements, current measurements, speed, temperature, etc.

This information may be captured and stored at a wide variety of times and events. Some examples are: power-up; at fixed time intervals during operation (for example every 5 minutes); and whenever a parameter falls out of normal operational range.

Recorded history may be important for identifying NTFs and helping to find real root cause of failures. What parameters and when to record them is driven by understanding function of the components and how they may fail. In this embodiment, recordings are made of all measured parameters, signal, time, and speed when any parameter is out of normal bounds, or a combination is out of norm (like one current sensor 450 is different than the other current sensor 450). If the error persists, constant recordings will fill up memory, so then only changes in in/out of bounds events are captured (no need to record the same out of normal condition repetitively.) All parameters are also recorded at power-up and power-down. Other combinatorial events also trigger recordings.

While it would be convenient to maintain the log over the lifetime of the vehicle, limited memory size may dictate capturing a fixed number of events. Still, it is possible to maintain running averages of the parameters. Use of an auto-regression filter to provide base line information would be an obvious choice for showing long term history of a particular parameter. An example of this "averaging" filter is:

average value=(0.95*average value+0.05*new value)

where average value is the running "average" and new value is the latest value that is to be included in the running average. An auto-regression filter is a type of low pass filter, not an average, but the numerical values may be approximate.

The recorded history and logged information could be displayed on the display 470 or 472 or uploaded to an external device, memory, computer and/or diagnostics bench via the I/O port 476. Human or machine access to this history is enabled in many forms.

Additional Features.

Security. The security feature discourages unauthorized use of the vehicle. There are many common methods and devices for vehicle security: examples are mechanical key switch, keypad with "pass number", and wireless fob. While shown separate from the system controller 440, the security device may be implemented as a number of pushbuttons and firmware or hardware residing in the system controller 440. The methods and device can also be used to limit use and provide safety. Parents may enter a code to limit child speed or distance, or a rider may limit speed for their own comfort. A security key switch can simply be a manual key—when turned on, the product functions.

Security key switch 460 can be linked to authentication. For instance: when switch 460 is turned on, the vehicle will operate only after authentication via the keypad 462 (entering the right code). Authentication could be alternatively accomplished (if there is no security key) through combination of power switch r26 being turned on followed by code entry on keypad r62.

If the current interrupter 424 is implemented with a relay or other resettable device, successful authentication can allow the system controller 440 to enable the current interrupter 424 to allow current to flow through the power loop.

Authentication can be achieved with a combination of user inputs. As noted, the security device can be used alone, in combination with the power switch 426, or in combination with other devices like the wheel rotation sensor. Authentication can be achieved without a specific security device by (for example) using a sequence of throttle 438 activations and the power switch 426.

Safety. Under normal conditions, the throttle 438 is sensed by the controller 440 to command the motor power controller 430. System controller 440 can moderate or change motor power control for safety, reliability, or other reasons. When the throttle 438 is "opening", the power control 430 may be slew rate limited to moderate vehicle acceleration. Or to limit power to the motor, decrease temperature in a component, or limit speed, the power may be moderated based on voltage or current feedback.

During and immediately after power on and/or security authentication the throttle is disabled and will remain disabled until the throttle signal 438 reports "full closed". This is a safety feature for the case where the throttle has malfunctioned in the on position; this feature will prevent the vehicle from unexpectedly starting on its own. In "speed limit mode," the system controller will inhibit the motor power controller so the motor doesn't accelerate as quickly, and/or achieve as fast a top speed.

If the Motor Controller 440 or some other component experiences a fault, it can fail in the "on" case causing the drive motor 428 to run outside of the control of the system controller 440. A failure is detected when throttle 438 is not calling for power in the motor power controller 430, yet there is current sensed beyond threshold in 450*a* and/or 450*b*. This failure will cause the system controller to interrupt the current at 424 and report the failure on the diagnostic display and record the event in the memory of the system controller 440. Turning off the current interrupter 424 may be implemented in an independent hardware module to sidestep SW errors impacting safety.

Power Management. When nearing fully discharged batteries, the system controller may attenuate motor power to simulate a dying battery as an alert to the rider. When the battery 20 pack is below energy threshold, the system processor 440 will limit motor power via motor power controller 430 to protect the batteries 420 from over discharge.

Most rechargeable batteries may be sensitive to over charging and over discharging; the life expectancy of batteries can be greatly reduced or enhanced with proper management. By employing proper power control, the system controller 440 can greatly extend battery life (5× to 10× is reasonable compared to battery abuse).

Depending upon the battery chemistry (NiCd, NiMh, Lead Acid, LiIon, etc.) there are limits for how the battery should be charged, and how far the battery should be discharged. These thresholds are well documented by the various battery manufacturers.

When the vehicle is operating under its own power, the power management firmware estimates the remaining power in the batteries. The actual parameters may be battery chemistry dependent, but even a simple "volts per cell" calculation can be sufficient. For example some batteries may be fully charged at 1.25 volts per cell and fully discharged at 1.10 volts per cell.

The amount of charge remaining is reported to the operation display 470 and used in calculating the amount of motor power to be delivered.

The battery charger communicates that the charger is active via signal 4100 and the system controller inhibits motor power.

Thermal Protection. Batteries 420 and drive motor 428 may be prone to damage due to overheating. However, all components may be sensitive to temperature and the system controller 440 may use various thermometers to protect the vehicle and its components.

For the batteries, the calculated ESR and current sensed at 450*a* and/or 450*b* can be used to calculate the power dissipated by the batteries ($I^2{*}R$ losses). Comparing battery power dissipated to motor power dissipated and referencing the motor temperature 454 gives an indication of the battery temperature. More simply, an embodiment may employ a thermal sensor on the batteries. When the batteries are too warm, the system controller 440 may limit the motor power controller 430 and report over temperature on the operation display 470 and/or the diagnostic display 472. The system controller may log the event in its semi-permanent memory.

The DC resistance of the drive motor 428 may be a known parameter from the motor's specification or initial factory test. Using the sensed current at 450*b* and/or 450*a* and the DC resistance, the non-motive power of the motor can be calculated ($I^2{*}R$). Temperature sensor 454 reports the temperature of the motor. Upon detection of motor over temperature, the system controller 440 may limit the motor power controller 430 and report over temperature on the operation display 470 and/or the diagnostic display 472. The system controller 440 may log the event in its semi-permanent memory.

This algorithm uses power and motor temperature to infer the temperature of the batteries and other components. Another implementation may be to simply place thermometers on the batteries and/or controller. Other algorithms which do not require thermometers can provide some thermal protection to the motor and batteries, even though they may not be as accurate.

To prevent extreme temperatures, motor power may be limited to a maximum current (such as 25 amps) for short periods of time (such as less than 10 seconds every minute) and a lower current (such as 15 amps) all other times. These types of power management can be implemented by monitoring current 450*b* and limiting the motor power controller 430.

Substitutions. FIG. 17 is only one embodiment of how to implement this Example 3. Substitutions of components can yield various feature changes. For example, the system controller, motor controller, and diagnostic system can be separate or integrated in any combination. The embodiment of FIG. 17 may be an efficient use of processor power, but separate modules may provide other benefits and still enable diagnostic implementation.

Operational Display 70. There may be a multitude of ways to implement the operational display. The minimum may be no display; a display is not required for vehicle operation. For very minimal display, implementation could be nothing more than a single red LED that blinks according to amount of charge left on the battery. An example might be: 1) LED off=½ to full charge; 2) slow blink=¼ to ½ charge; 3) fast blink=¼ charge to empty; 4) LED on=empty. This "fuel gage" could also be implemented as multiple LEDs in a bar graph.

In a higher level configuration, the operational display could be implemented as a custom LCD display with multiple operational states (fuel, speed, time of day, power consumption . . . ) displayed concurrently.

Multi-Threaded Architecture. Depending on hardware design, the flow diagram of FIG. 18 could be implemented as a multi-threaded architecture to achieve the goals of this Example 3.

Battery Implementation. FIG. 17 describes a series battery implementation. FIG. 20 depicts a series-parallel battery configuration; parallel battery configurations provide different power attributes for an EV, and these diagnostics can be as powerful as in series only configurations. Battery voltage signals can be tapped for the controller, and battery power balancing circuits can be employed to balance power delivery and charging current to the bank of batteries.

Micro-Controller. A micro-controller can be implemented with FPGA or equivalent logic, or more complex and capable computer systems.

Sub-Assemblies. Diagnostic methods and circuitry are used to assess working status of sub-assemblies and/or components of an electric vehicle. Components and subassemblies may consist of the following types of elements: motor, gears, chains, wheels, controller, throttle, battery, battery charger, additional circuitry, switches, connectors, and wires.

Tree Guides. A defined troubleshooting tree guides the process for efficiency and accuracy. Tools to measure current, voltage, at specific times complement visual inspection to check motor, controller, throttle, and battery function. Some or none of the measurement tools can be external to the vehicle or integrated into the electronics.

Motor test for brush motors, brushless motors, induction motors, and others types require different algorithms for comprehensive evaluation. This Example 3 encompasses the sensors, connection, and algorithms necessary to test various motors effectively. For example, a DC brushless motor can be tested for hall sensor function and winding evaluation for all motor phases.

Component Simulators. A test bench with component simulators can speed diagnosis by allowing the user to substitute known working parts for suspected malfunctioning items and then testing the rest of the system.

As can be easily understood from the foregoing, the basic concepts of the present inventive technology may be embodied in a variety of ways. It involves both electric vehicle powering techniques as well as devices to accomplish the appropriate electrically powered vehicles. In this application, the electric vehicle powering techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "processor" should be understood to encompass disclosure of the act of "processing"—whether explicitly discussed or not—and, conversely, were there effectively disclosure of the act of "processing", such a disclosure should be understood to encompass disclosure of a "processor" and even a "means for processing" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the List of References below or other information statement filed with the application are hereby appended and hereby incorporated by reference, however, as to each of the above, to the extent that such information or statements incorporated by reference might be considered inconsistent with the patenting of this/these inventive technology(s) such statements are expressly not to be considered as made by the applicant(s).

U.S. Patents

| Pat. No. | Issue Date | Name of Patentee or Applicant of cited Document |
| --- | --- | --- |
| 6,684,971 B2 | 2004 Feb. 03 | Yu et al. |
| 5,865,267 | 1999 Feb. 02 | Mayer et al. |
| 5,579,227 | 1996 Nov. 26 | Simmons, Jr. et al. |
| 5,671,821 | 1997 Sep. 30 | McGreen |
| 5,370,200 | 1994 Dec. 06 | Takata |
| 4,521,885 | 1985 Jun. 04 | Melocik et al. |
| 4,286,700 | 1981 Sep. 01 | Morris et al. |
| 4,245,309 | 1981 Jan. 13 | Kiefer |
| 4,191,065 | 1980 Mar. 04 | Golobay et al. |
| 7,206,618 B2 | 2007 Apr. 17 | Latto et al. |
| 6,725,955 B2 | 2004 Apr. 27 | Bidwell |
| 6,196,604 B1 | 2001 Mar. 06 | Hoh et al. |
| 6,130,487 | 2000 Oct. 10 | Bertalan et al. |
| 5,894,898 | 1999 Apr. 20 | Catto |
| 5,842,535 | 1998 Dec. 01 | Dennis |
| 5,816,349 | 1998 Oct. 06 | Hankins |
| 5,491,390 | 1996 Feb. 13 | McGreen |
| 5,141,067 | 1992 Aug. 25 | Diggs |
| 4,461,365 | 1984 Jul. 24 | Diggs |
| 4,413,692 | 1983 Nov. 08 | Clifft |
| 3,915,250 | 1975 Oct. 28 | Laden et al. |

U.S. Patent Application Publications

| Publication Number | | |
| --- | --- | --- |
| 20080023234 A1 | 2008 Jan. 31 | Wang |

Foreign Patent Documents

| Foreign Document Number | Country Code | Publication Date | Name of Patentee or Applicant of cited Document |
| --- | --- | --- | --- |
| 2249529A | UK | 1992 May 13 | Hsu et al. |
| 2141068A1 | EP | 2010 Jan. 06 | Chen |
| 2562222A1 | CA | 2008 Mar. 26 | Kielland |
| 10-0912404B1 | KR | 2009 Aug. 24 | SAM HYUN CO LTD |
| 10-0912404B1 | KR | 2009 Aug. 10 | SAM HYUN CO LTD |
| 2008038213A2 | WO | 2008 Apr. 03 | Kielland |
| 2009119993A | JP | 2009 Jun. 04 | SANYO ELECTRIC CO |

Non-Patent Literature Documents

Halfbakery.com, Bike hub with two motors, Dec. 8, 2009, 4 pages

U.S. Provisional Patent No. 61/250,863, filed Oct. 12, 2009, entitled Electric Vehicle Diagnostic System U.S. Provisional Patent No. 61/179,536, filed May 19, 2009, entitled Two Motor Dual Electric Trailer U.S. Provisional Patent No. 61/180,846, filed May 23, 2009, entitled Portable Throttle for Electric Cycles and Trailers Thus, the applicant(s) should be understood to have support to claim and make a statement of invention to at least: i)

each of the electrically powered vehicle devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A hand actuated accessory for a biomechanically powered vehicle, wherein the biomechanically powered vehicle includes a substantially tubular manual control surface and one or more preinstalled components associated with the substantially tubular manual control surface, the accessory comprising:
   a controller operable to generate control signals;
   a support structure operable to hold the controller proximate to the substantially tubular manual control surface of said biomechanically powered vehicle wherein the support structure is rotatable about a longitudinal axis of the manual control surface and is adjustably positionable along the longitudinal axis of the manual control surface so to be compliant with and impedance free of operability of the one or more preinstalled components associated with the substantially tubular manual control surface; and
   a mounting surface associated with said support structure operable to engage a length of said substantially tubular manual control surface of said biomechanically powered vehicle and wherein said mounting surface is flexible along the engaged length of the longitudinal axis of the manual control surface; wherein the support structure is folded around a circuit and at least one button to encase the circuit and button; and wherein the button extends through the support structure to an outer side of the support structure.

2. A hand actuated accessory for a biomechanically powered vehicle as described in claim 1 wherein said support structure and mounting surface are operable to engage said substantially tubular manual control surface so as not to interact or interfere with operations of the one or more preinstalled components, and wherein the one or more preinstalled components are selected from a group consisting of a handbrake, a gear shifter, a hand grip, a handle bar extension, a bar end, a bell, a light, and a display.

3. A hand actuated accessory for a biomechanically powered vehicle as described in claim 1 wherein the controller is operable to generate a plurality of control signal levels.

4. A hand actuated accessory for a biomechanically powered vehicle as described in claim 1 wherein the mounting surface and support structure are operable to reversibly couple the accessory to the substantially tubular manual control surface.

5. A hand actuated accessory for a biomechanically powered vehicle as described in claim 1 wherein said one or more preinstalled components are selected from group of biomechanically powered vehicle components consisting of a handgrip, a brake assembly, a shifting assembly, a mirror, an audio signaling device.

6. A hand actuated accessory for a biomechanically powered vehicle as described in claim 1 wherein said controller comprises a throttle.

7. A hand actuated accessory for a biomechanically powered vehicle as described in claim 6 wherein said throttle can be positioned so as to be actuated by a thumb of a user or by one or more fingers of a user based on how the mounting surface and support structure engages the substantially tubular manual control surface.

8. A hand actuated accessory for a biomechanically powered vehicle as described in claim 1, wherein said controller comprises a throttle to which an electrically powered vehicle drive system is responsive.

9. A hand actuated accessory for a biomechanically powered vehicle as described in claim 8 wherein said support structure and said mounting surface comprise a laminar flexible sheet to which said throttle is held.

10. A hand actuated accessory for a biomechanically powered vehicle as described in claim 1 wherein the hand actuated accessory is mountable to engage the substantially tubular manual control surface so as to allow user interaction with the controller by either one or more lateral finger flexion or thumb flexion when an anterior hand surface is oriented toward the substantially tubular manual control surface.

11. A hand actuated accessory for a biomechanically powered vehicle as described in claim 1, wherein the control signals are electrical control signals.

12. A hand actuated accessory for a biomechanically powered vehicle as described in claim 1, further comprising a supplemental electric propulsion trailer connected to said biomechanically powered vehicle, and wherein said hand actuated accessory comprises a throttle to which said electric propulsion trailer is responsive.

13. A method for mounting a hand actuated accessory to a biomechanically powered vehicle wherein the biomechanically power vehicle includes a substantially tubular manual control surface and one or more preinstalled components associated with the substantially tubular manual control surface, the method comprising the steps of: folding a support structure around a circuit and at least one button to encase the circuit and button;

positioning the button to extend through the support structure to an outer side of the support structure;

positioning the support structure associated with said hand actuated accessory on a length of the substantially tubular manual control surface of said biomechanically powered vehicle to be free of impedance with operation of the one or more preinstalled components and wherein the hand actuated accessory includes a controller operable to generate control signals; and engaging a mounting surface associated with said support structure to the substantially tubular control surface of said biomechanically powered vehicle wherein the mounting surface and associated support structure can be reversed with respect to a longitudinal axis of the substantially tubular control surface and wherein the mounting surface is flexible along the length of the substantially tubular control surface.

14. A method for mounting a hand actuated accessory to a biomechanically powered vehicle as described in claim 13 wherein said controller comprises a throttle operable to generate a plurality of control signal levels.

15. A method for mounting a hand actuated accessory to a biomechanically powered vehicle as described in claim 13, wherein said hand actuated accessory comprises a throttle to which an electrically powered vehicle drive is responsive.

16. A method for mounting a hand actuated accessory to a biomechanically powered vehicle as described in claim 13 wherein said step of engaging includes securing said mounting surface to the substantially tubular manual control surface using a hook and loop apparatus.

17. A method for mounting a hand actuated accessory to a biomechanically powered vehicle as described in claim 13, wherein said hand actuated accessory comprises a throttle, and further comprising the steps of connecting a supplemental electric propulsion trailer to said biomechanically powered vehicle and propelling said biomechanically powered vehicle with said supplemental electric propulsion trailer responsive to said throttle.

* * * * *